(12) United States Patent
Suzuki et al.

(10) Patent No.: US 6,256,133 B1
(45) Date of Patent: Jul. 3, 2001

(54) OPTICAL SCANNING APPARATUS

(75) Inventors: Seizo Suzuki; Magane Aoki, both of Kanagawa-ken; Kohji Sakai, Tokyo, all of (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/344,633

(22) Filed: Jun. 25, 1999

(30) Foreign Application Priority Data

Jul. 3, 1998 (JP) .................................................. 10-189026

(51) Int. Cl.⁷ .................................................... G02B 26/08
(52) U.S. Cl. .......................... 359/207; 359/205; 359/206; 359/216
(58) Field of Search ..................................... 359/205–207, 359/216–219, 662, 708, 711–717; 347/258, 259

(56) References Cited

U.S. PATENT DOCUMENTS 5,418,639  *  5/1995  Yamazaki ............................. 359/216

FOREIGN PATENT DOCUMENTS

| 2-23313 | 1/1990 | (JP) . |
|---|---|---|
| 07113950 | 5/1995 | (JP) . |
| 7-69521 | 7/1995 | (JP) . |
| 08122635 | 5/1996 | (JP) . |
| 08297256 | 11/1996 | (JP) . |
| 10-148755 | 6/1998 | (JP) . |

* cited by examiner

Primary Examiner—James Phan

(57) ABSTRACT

An optical scanning apparatus is constructed such that a light beam from a light source is formed into a linear image extending in a main scanning direction and is caused to be deflected at a constant velocity by virtue of a light deflecting system having a deflective reflecting surface which is located in a vicinity of an image formation position of the linear image. The deflected light beam is allowed to transmit through a scanning image formation lens so as to be converged into a beam spot on a surface to be scanned, thus causing the beam spot to scan the surface to be scanned at a constant speed. The scanning image formation lens is formed by more than two lens elements and has at least one special surface special surface in which a sub-scanning curvature changes in a main scanning direction according to a distance from an optical axis toward a periphery of the lens surface such that a line passing through centers of curvature in the sub scanning curvature is curved, and at least one of the special surfaces is formed so that the change of a sub-scanning curvature is non-symmetrical in the main scanning direction and the curvature has at least two or more than two extreme values.

23 Claims, 30 Drawing Sheets

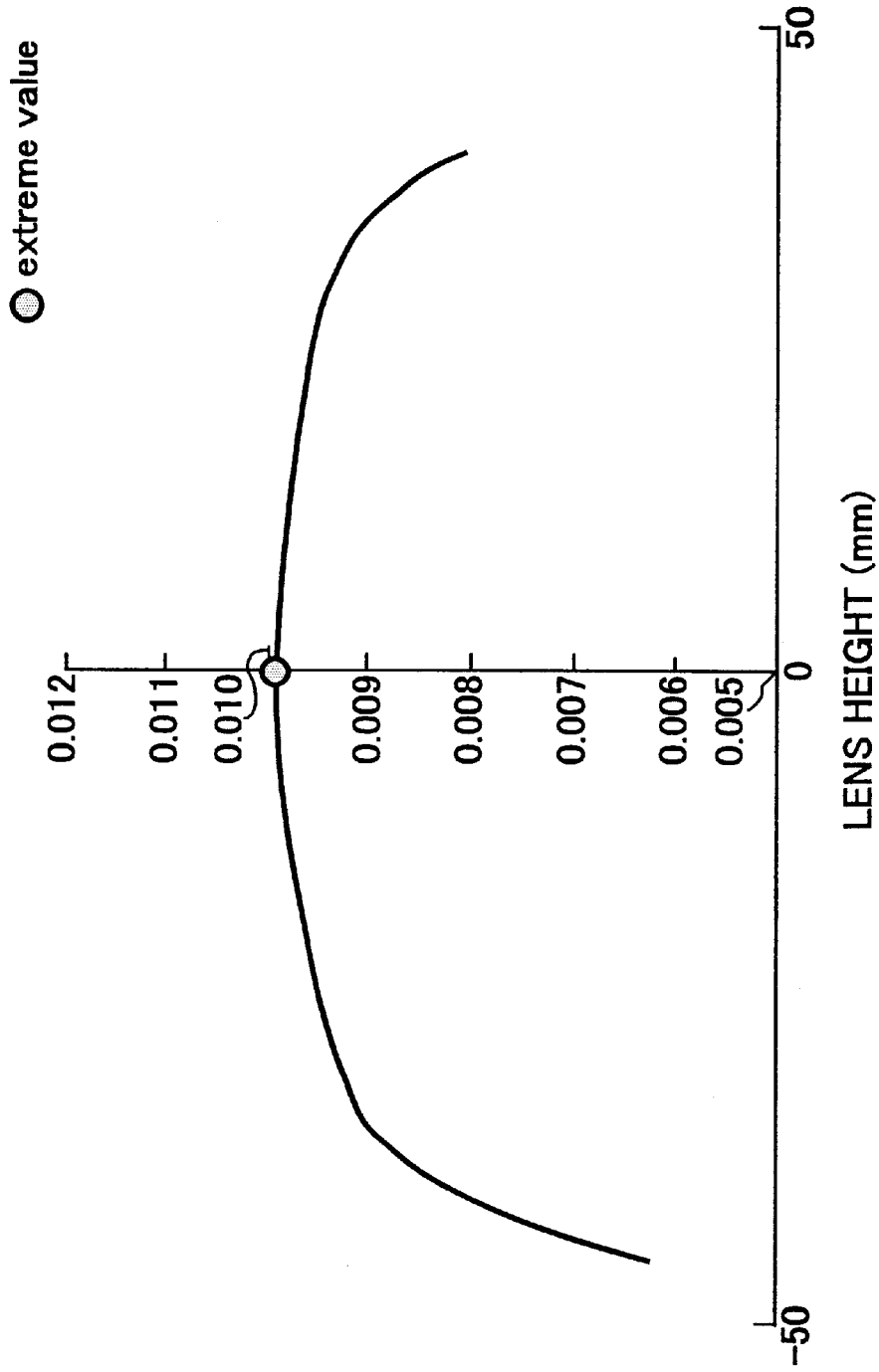
FIG. 3A EXAMPLE 1
THIRD SURFACE SUB-SCANNING CURVATURE

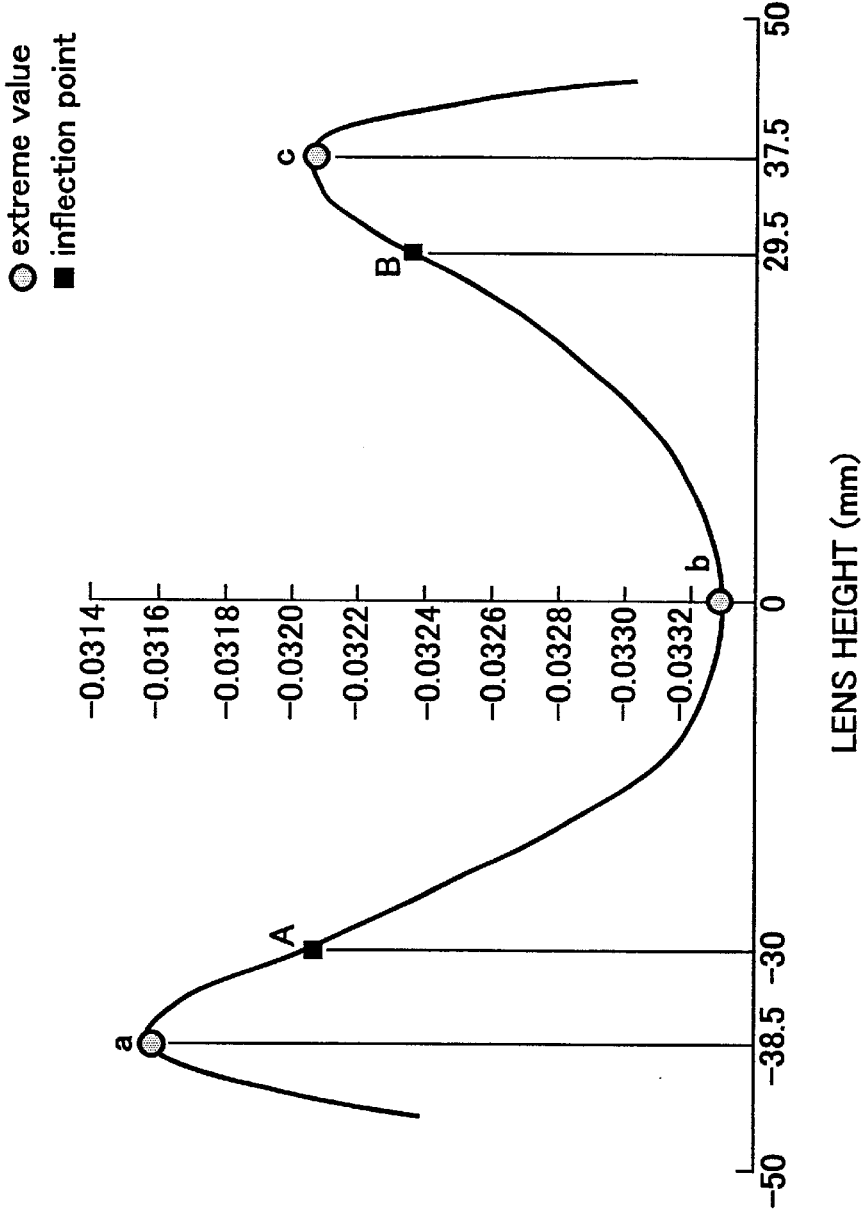
FIG. 3B  EXAMPLE 1
FOURTH SURFACE SUB-SCANNING CURVATURE

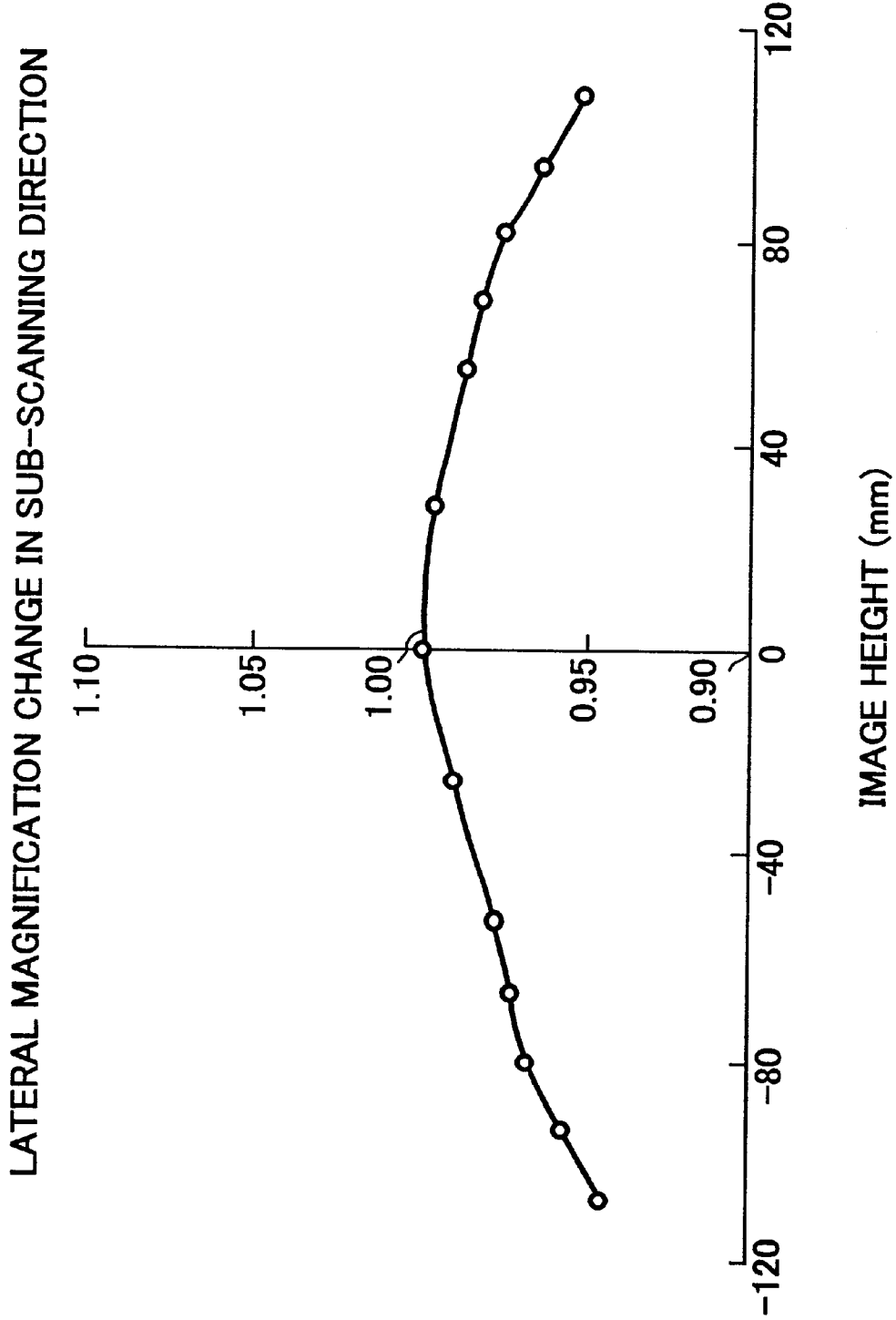
FIG. 3C EXAMPLE 1

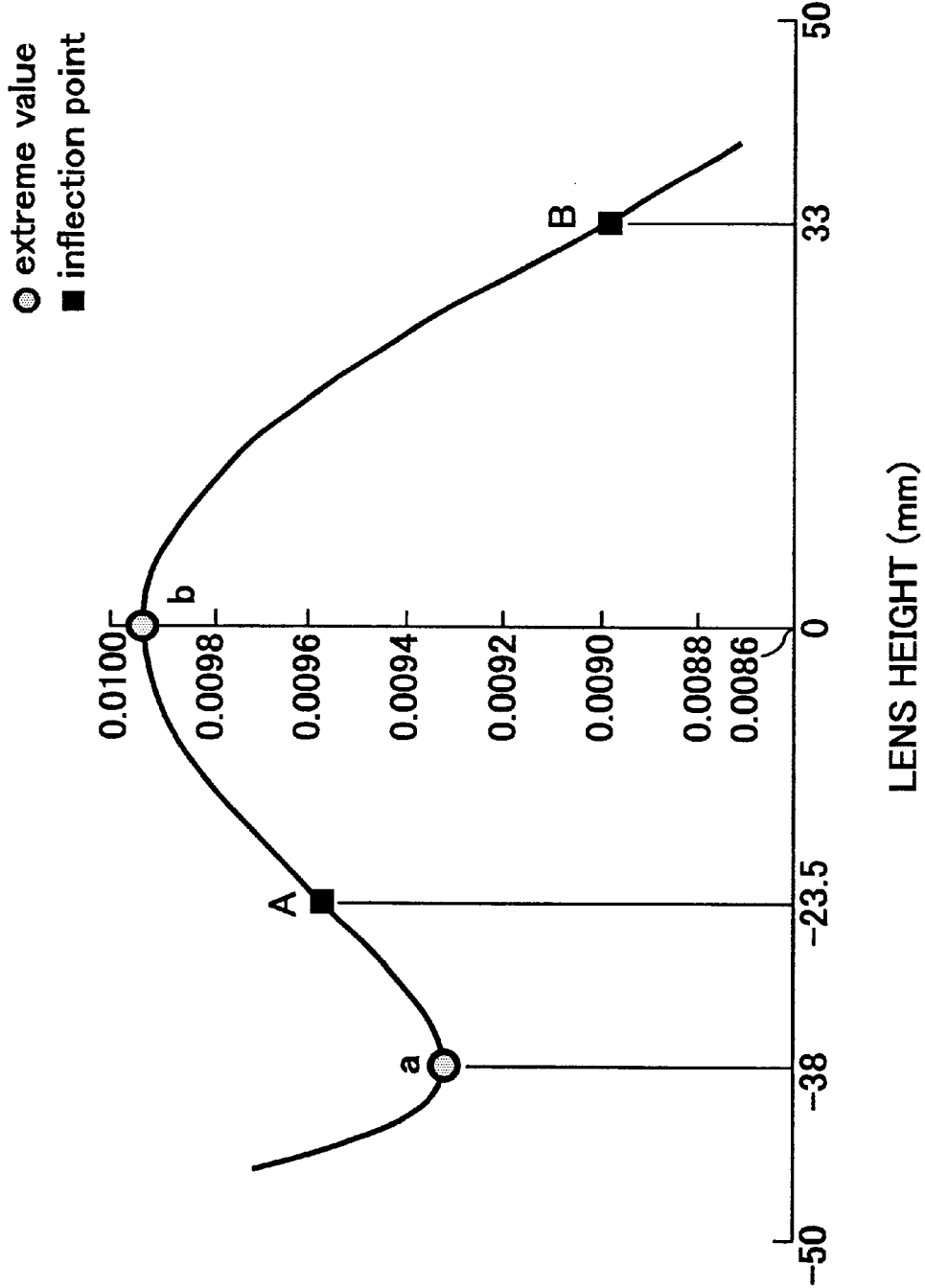
FIG. 4A  EXAMPLE 2
THIRD SURFACE SUB-SCANNING CURVATURE

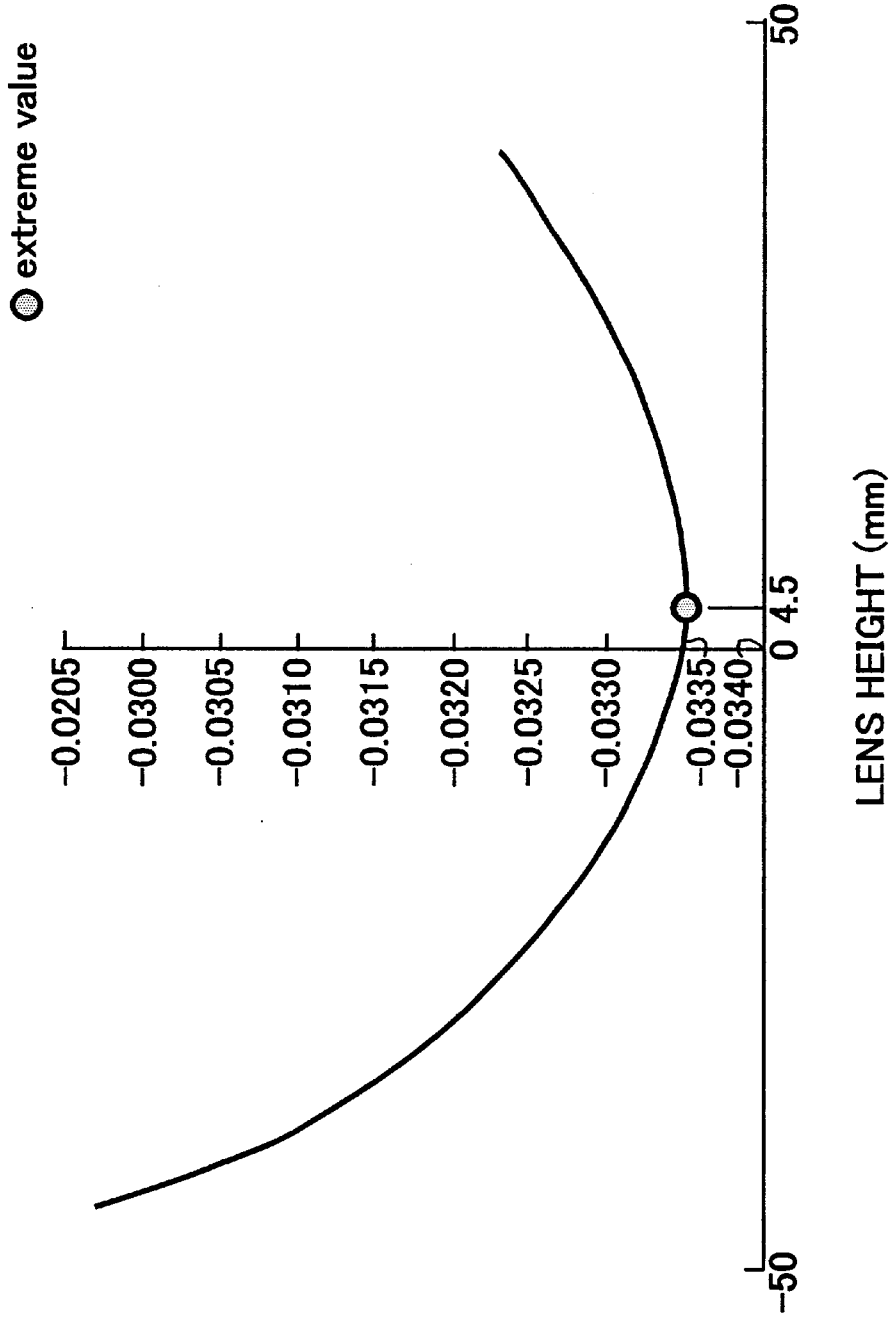
FIG. 4B  EXAMPLE 2
FOURTH SURFACE SUB-SCANNING CURVATURE

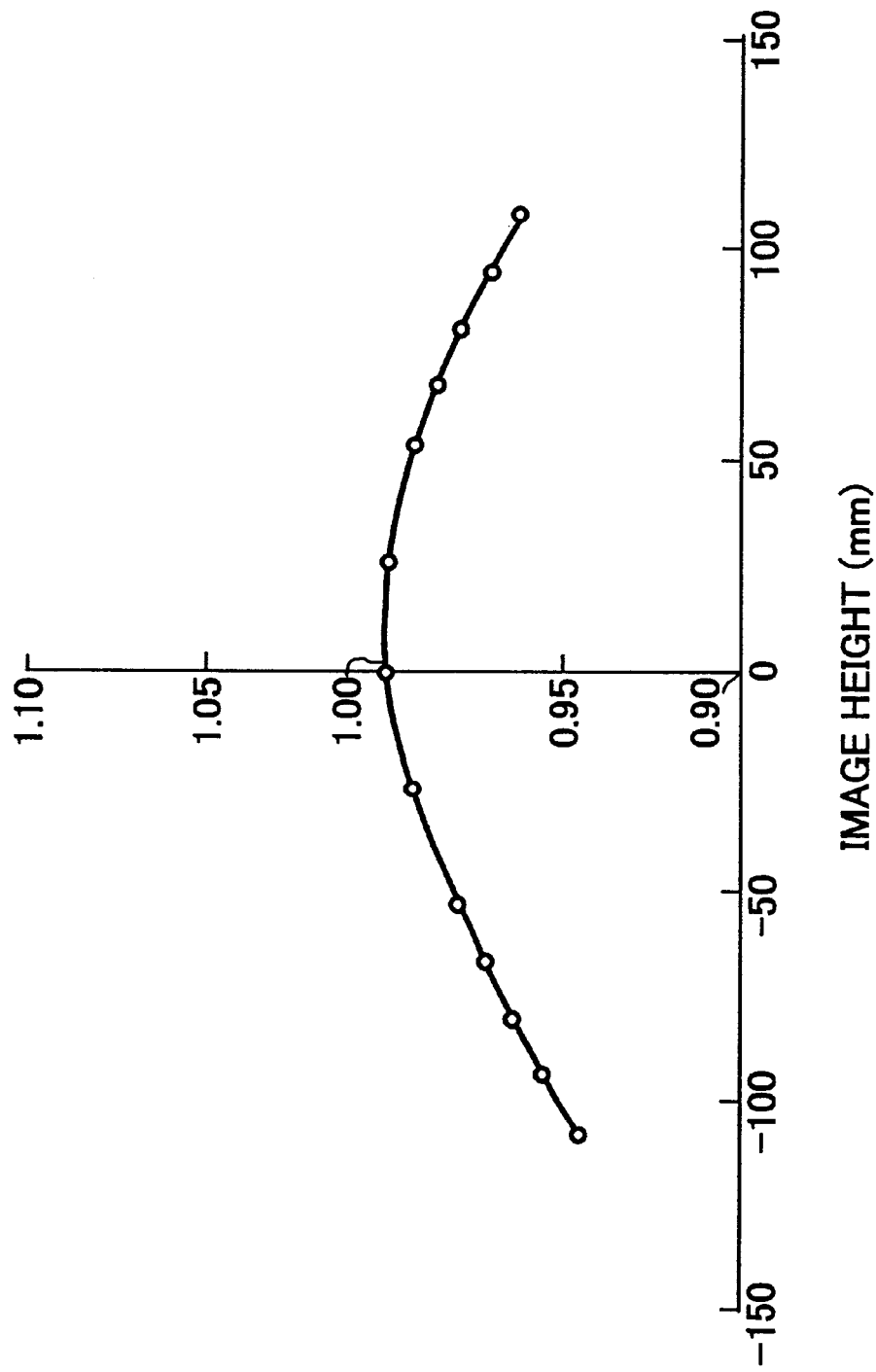
FIG. 4C  EXAMPLE 2
LATERAL MAGNIFICATION CHANGE IN SUB-SCANNING DIRECTION

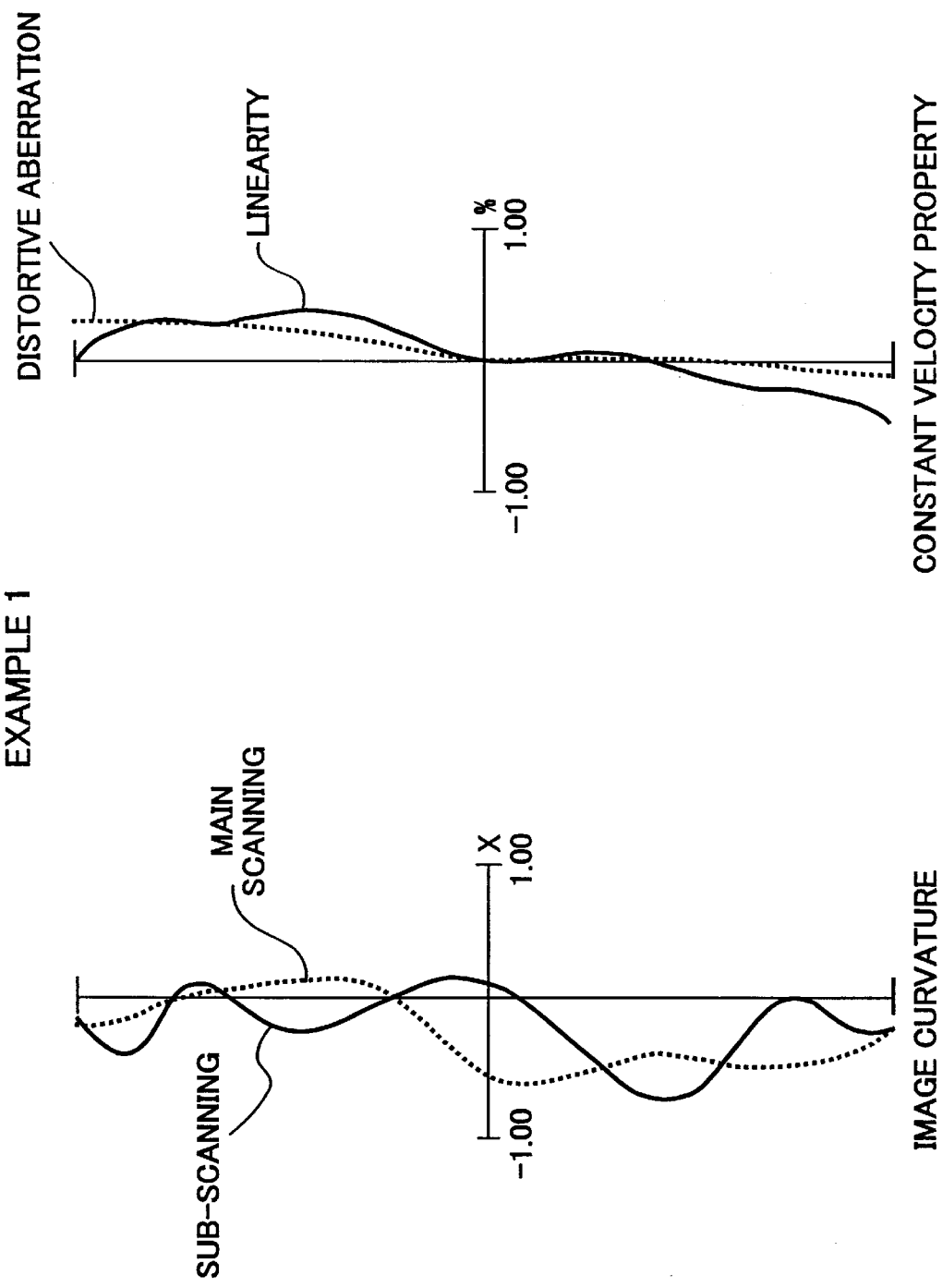

EXAMPLE 2

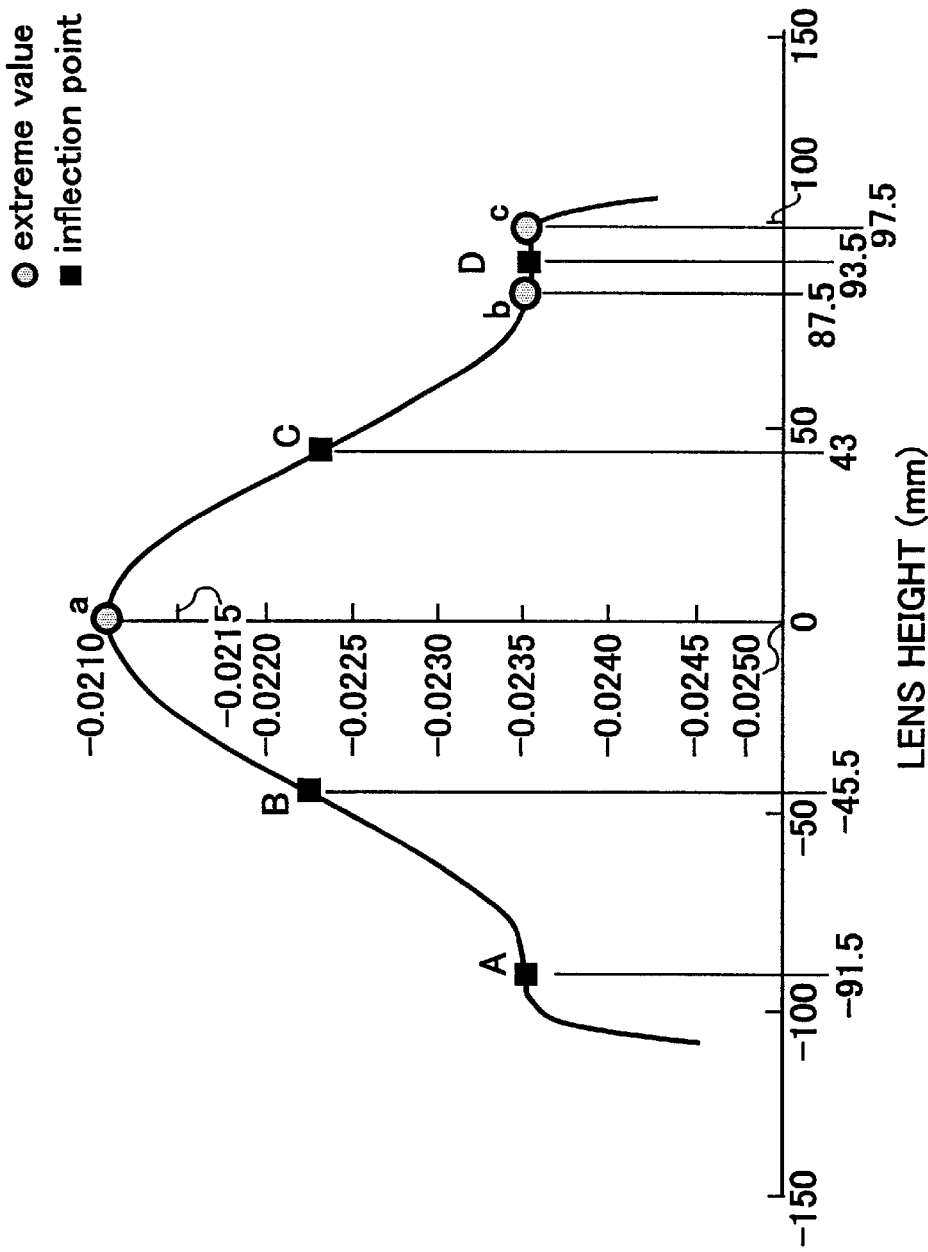
FIG. 7A EXAMPLE 3
THIRD SURFACE SUB-SCANNING CURVATURE

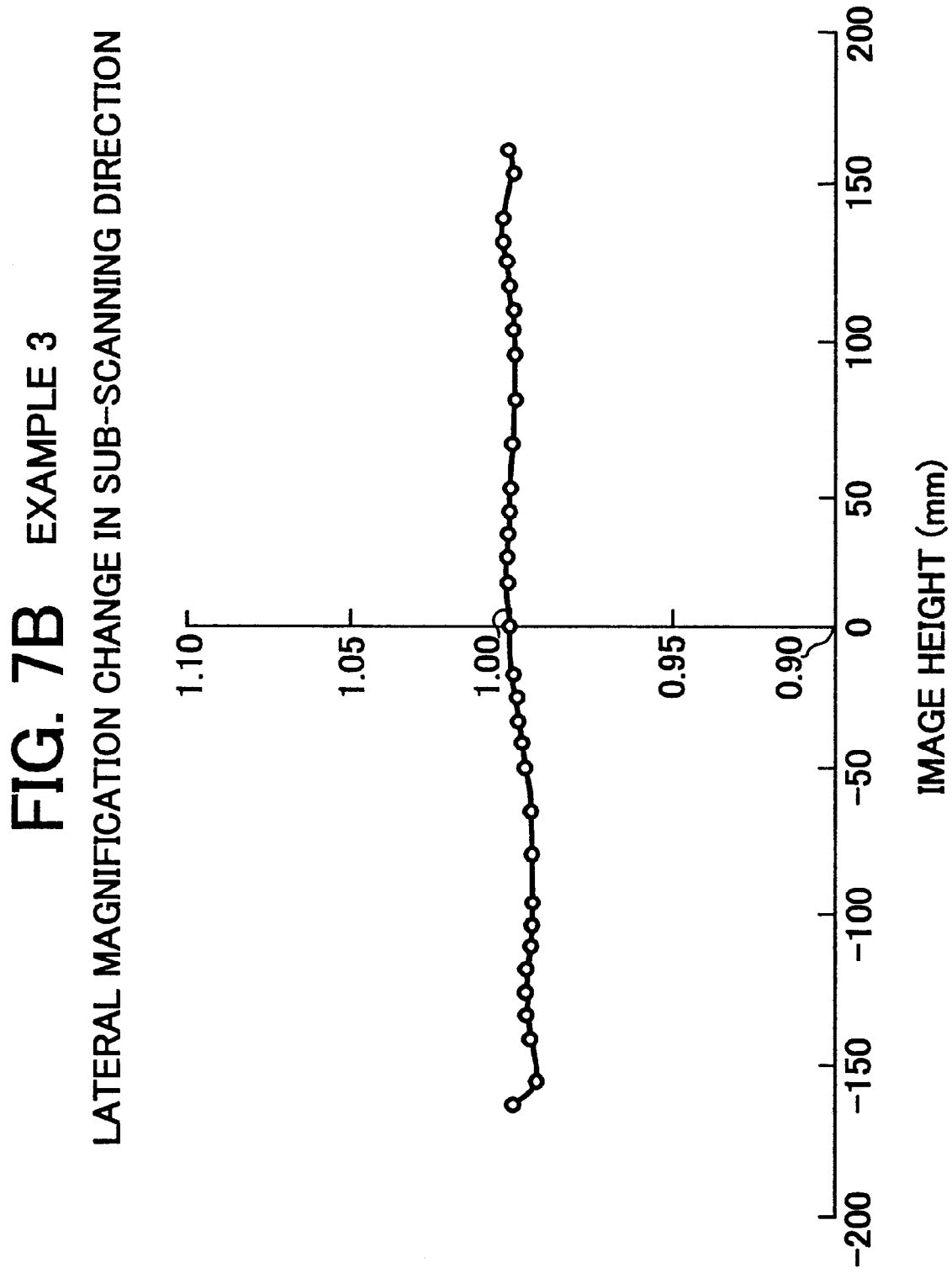
FIG. 7B EXAMPLE 3
LATERAL MAGNIFICATION CHANGE IN SUB-SCANNING DIRECTION

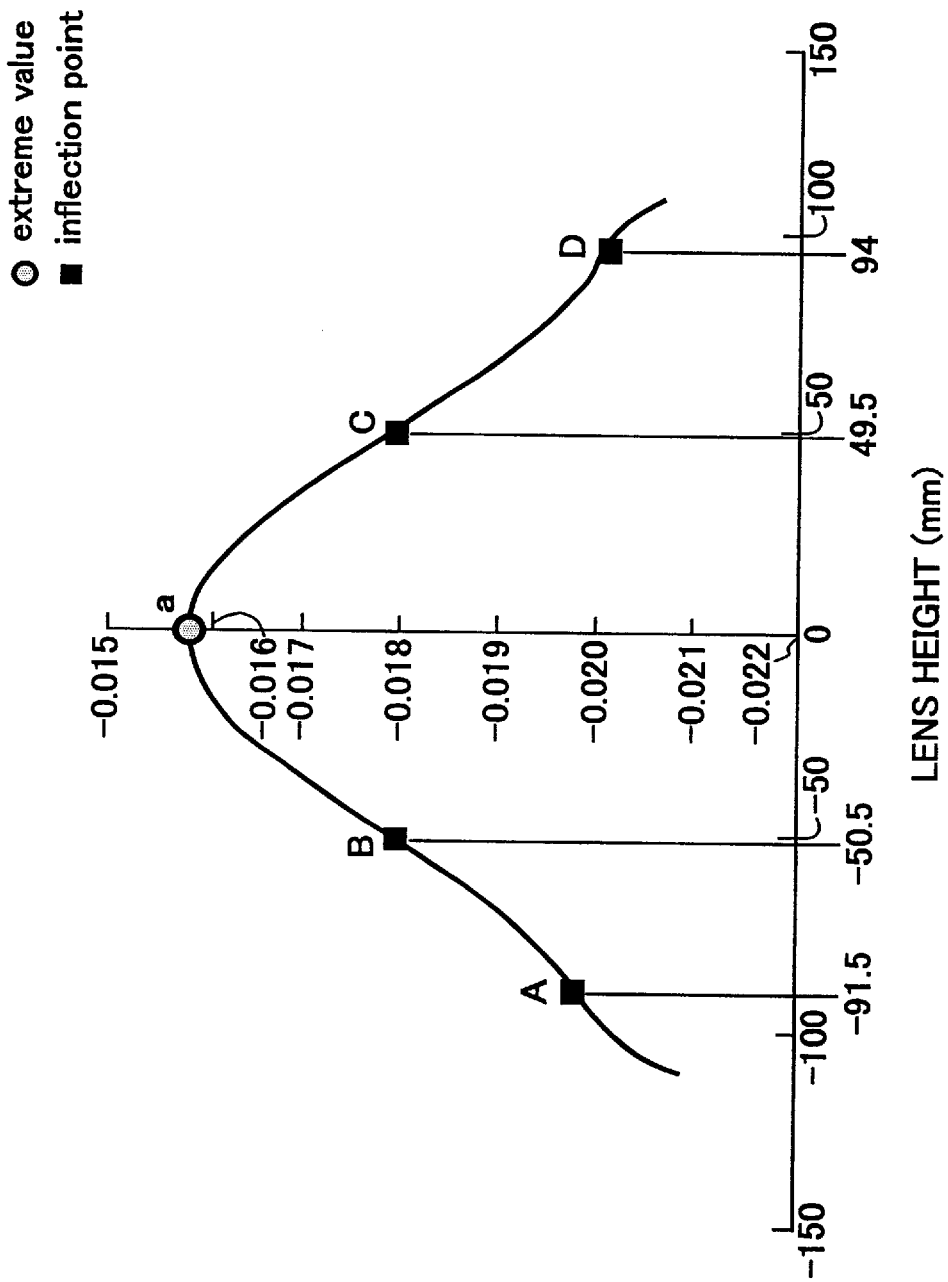

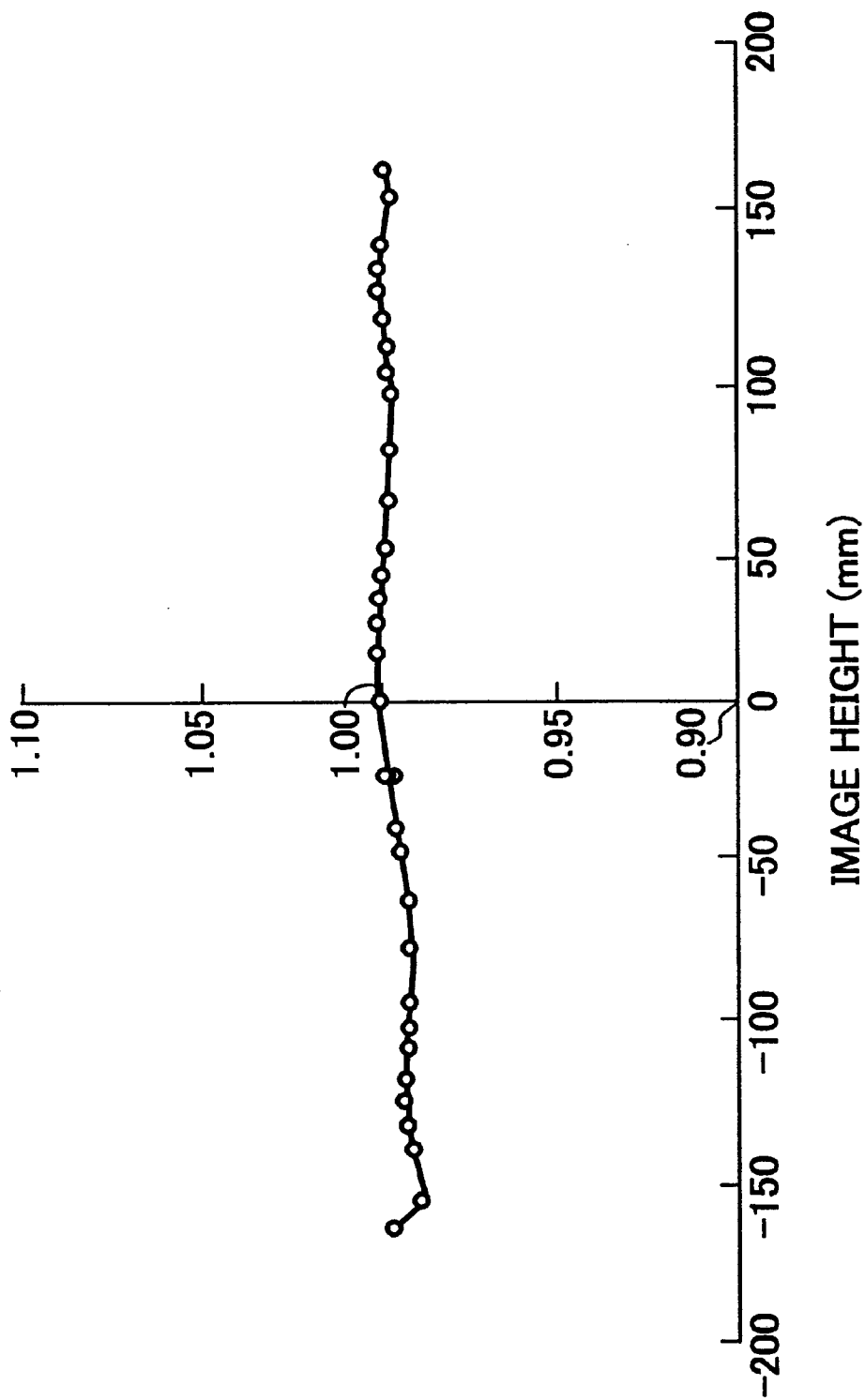

EXAMPLE 3

EXAMPLE 4

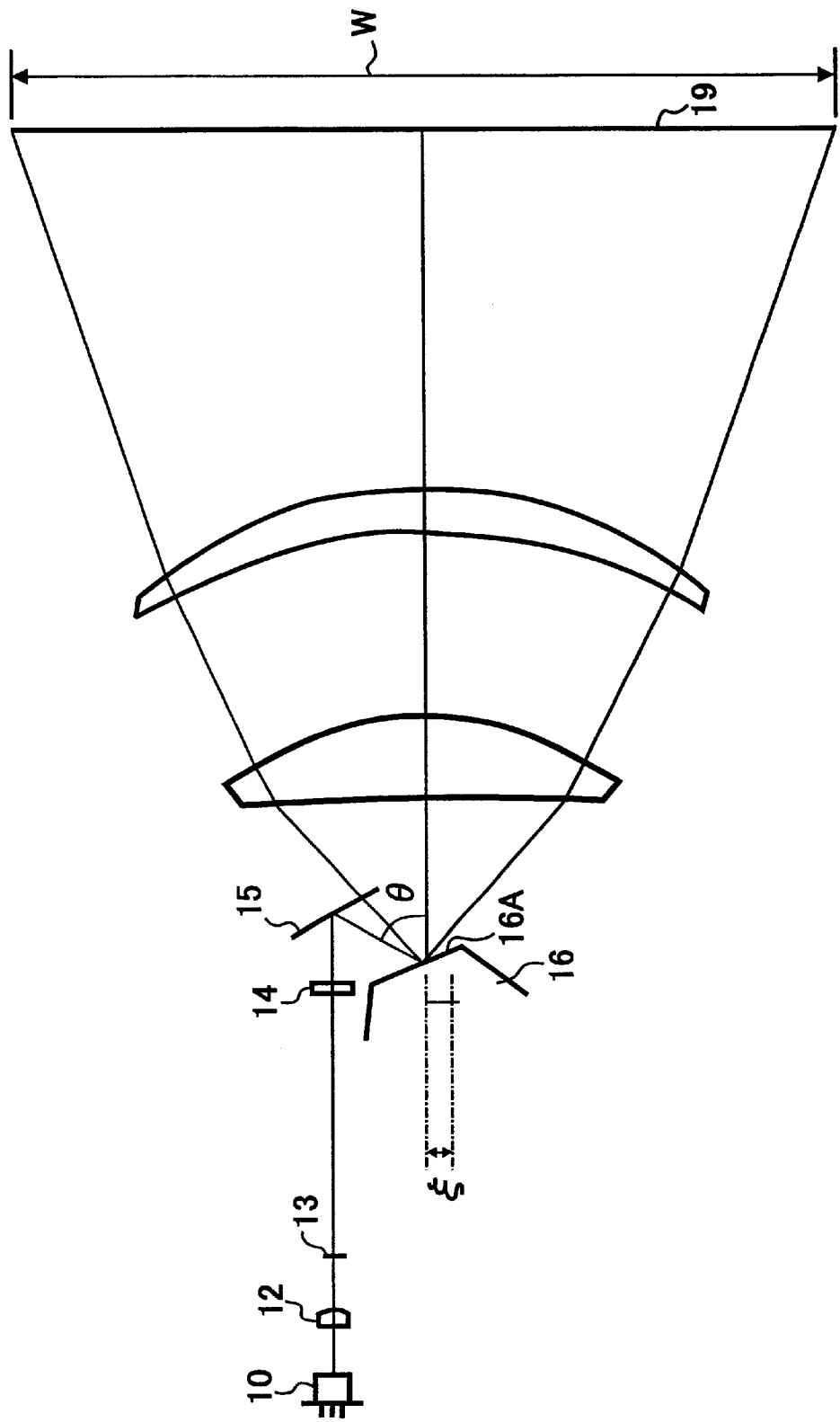

EXAMPLE 5
THE SECOND SURFACE SUB-SCANNING CURVATURE

EXAMPLE 5
THE THIRD SURFACE SUB-SCANNING CURVATURE

EXAMPLE 5
LATERAL MAGNIFICATION CHANGE IN SUB-SCANNING DIRECTION

EXAMPLE 5

EXAMPLE 6

EXAMPLE 6
THE FIRST SURFACE SUB-SCANNING CURVATURE

EXAMPLE 6
THE FOURTH SURFACE SUB-SCANNING CURVATURE

EXAMPLE 6
LATERAL MAGNIFICATION CHANGE IN SUB-SCANNING DIRECTION

EXAMPLE 6

EXAMPLE 7

EXAMPLE 7
THE SECOND SURFACE SUB-SCANNING CURVATURE

EXAMPLE 7
THE THIRD SURFACE SUB-SCANNING CURVATURE

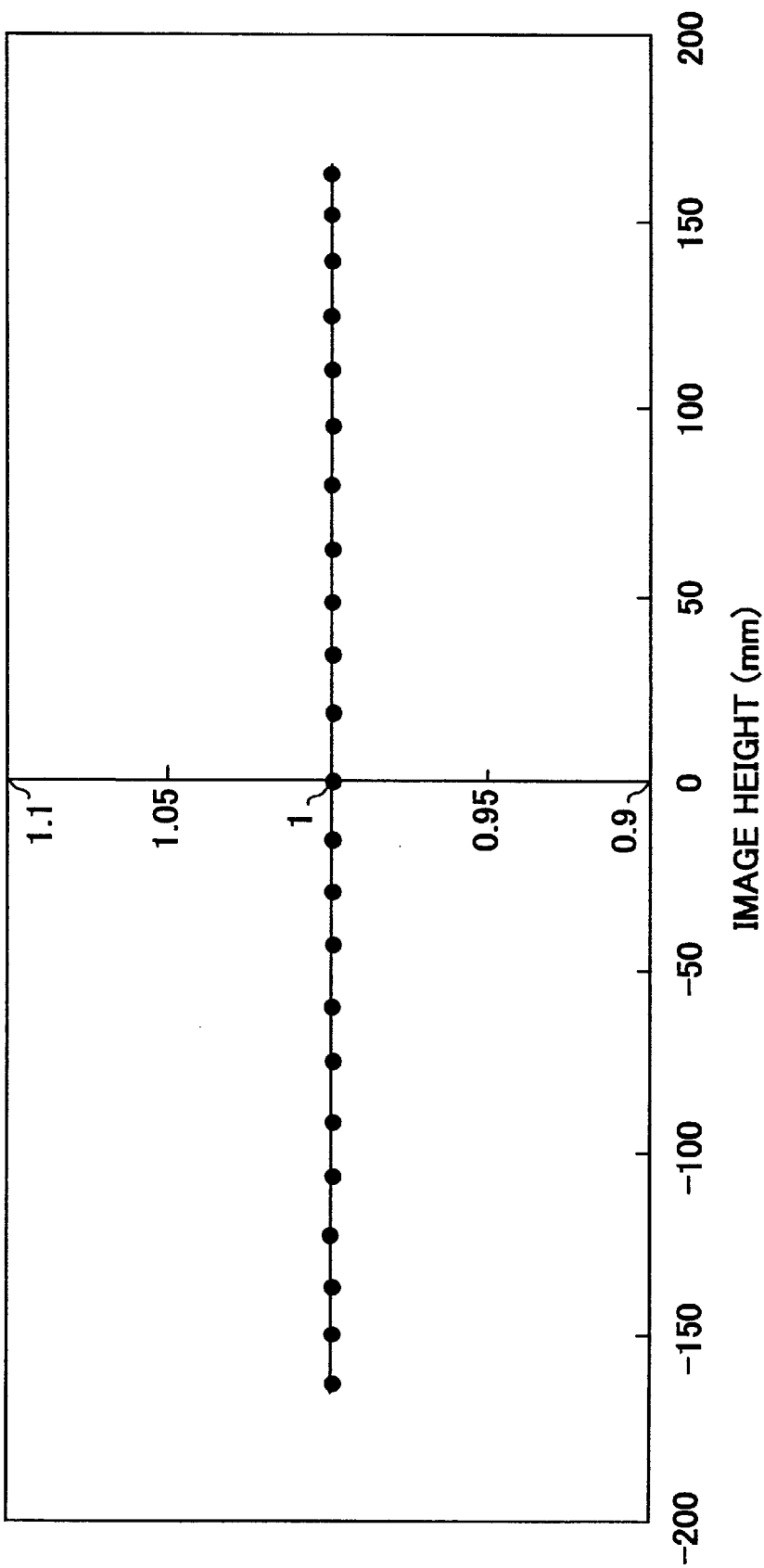
FIG. 18C  EXAMPLE 7
LATERAL MAGNIFICATION CHANGE IN SUB-SCANNING DIRECTION

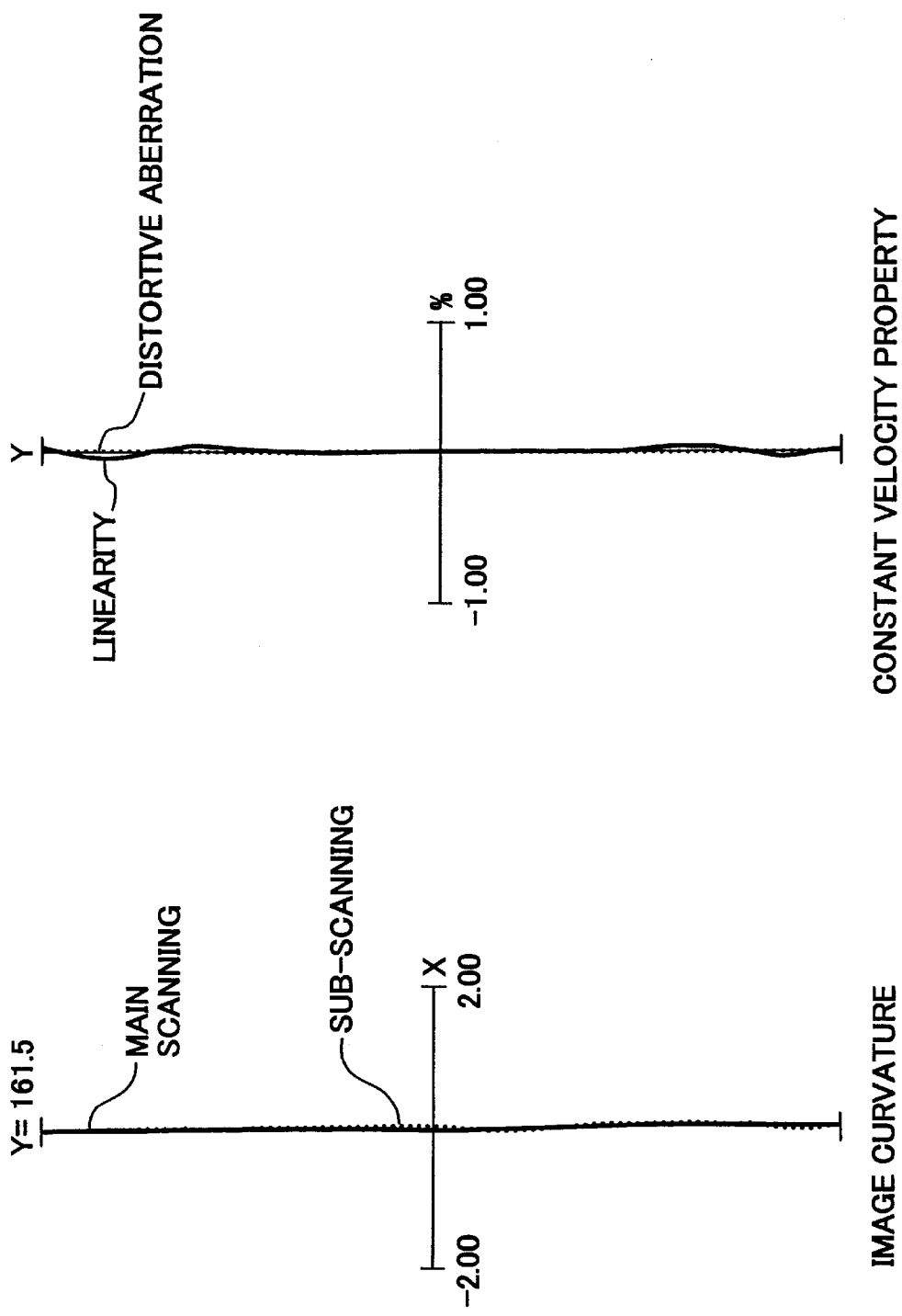

OPTICAL SCANNING APPARATUS

BACKGROUND OF THE INVENTION

1. Field of the Invention

The present invention relates to an optical scanning apparatus.

2. Discussion of Related Art

A currently used optical scanning apparatus is arranged such that a light beam from a light source is caused to be deflected at a constant velocity, via a light deflecting system having a deflective reflecting surface. The deflected light beam, effected by the scanning image formation lens, is converged into a beam spot on a surface to be scanned, thus causing a beam spot to scan the surface to be scanned at a constant speed. In general, such an optical scanning apparatus is commonly used in an information writing device of a laser printer, a facsimile machine, or a digital copy machine.

As a light deflecting system for deflecting a light beam introduced into a scanning image formation lens, a polygon mirror has been commonly used. Because the rotating center axis of the polygon mirror is generally located at a position that is not coincident with the optical axis of the scanning image formation lens, a rotation of the polygon mirror will cause a change in a relationship between a deflective reflecting point and a scanning lens, producing a phenomenon called "sag".

When such a sag condition occurs, it is very likely that deterioration of the written image will occur, particularly in an image curvature in a sub-scanning direction (hereinafter referred to as "sub-scanning image curvature").

More specifically, in an optical scanning apparatus using a polygon mirror, in order to correct a surface tilt of the polygon mirror, an incident light beam introduced into a scanning image formation lens is not a parallel light beam with respect to the sub-scanning direction. With a change of the deflective reflecting point, an image formation position in the sub-scanning direction will be changed, resulting in deterioration of the sub-scanning image curvature.

A deflected light beam introduced into the scanning image formation lens, with respect to the main scanning direction, is allowed to be a parallel light beam or is allowed to be a light beam having a certain divergence or a certain convergence, thereby providing some technical merits when being used in various conditions. On the other hand, if a deflected light beam to be introduced into the scanning image formation lens is a light beam having a certain convergence or a certain divergence in the main scanning direction, an influence possibly brought about by the sag is likely to cause a deterioration in the image curvature in the main scanning direction (hereinafter referred to as "main scanning image curvature") and in a constant scanning speed property, as in the sub-scanning direction.

As a method for reducing an influence possibly caused due to the sag, it has been known that a scanning image formation lens may be shifted or tilted within a main scanning plane (ideally, in a plane where the main light ray of a deflected light beam is just sweeping). However, with this method, both the main scanning image curvature and the sub-scanning image curvature are difficult to be completely corrected at the same time. Therefore, this method is not sufficient for controlling a diameter change of a beam spot when such a beam spot diameter has already been made small in order to obtain a high writing density for information recording. As a result, the above method cannot satisfy the demand for recording information with a high writing density.

Further, as a method for correcting an influence which will possibly be caused by the sag, there has been suggested another method in which a sub-scanning radius of curvature of a scanning image formation lens is non-symmetrical with respect to an optical axis (Japanese Unexamined Patent Publication No. 2-23313; Japanese Examined Patent Publication No. 7-69521; Japanese Unexamined Patent Publication No. 7-113950; Japanese Unexamined Patent Publication No. 8-122635; Japanese Unexamined Patent Publication No. 8-297256).

With the use of the method as suggested in the above-noted Japanese Patent Publications, because an image formation position of a light beam is coincident with a scanned surface with respect to each image height, in principle, it has become possible to completely correct a sub-scanning image curvature irrespective of the existence of the sag.

Recently, with a remarkable development in obtaining a high density for information writing, a demand for making a diameter of a light beam spot smaller and improving stability in obtaining a light beam spot having a smaller diameter has increased. In order to satisfy such a demand, it has become important that not only the image curvature but also the optical magnification of a scanning optical system be uniformly set irrespective of what an image height is. If a beam spot has a change in its optical magnification according to an image height, the waist diameter of the beam spot will also change substantially in proportion to a lateral magnification. As a result, it is impossible to obtain "a stabilized beam spot" capable of avoiding a change in the diameter of a beam spot, which change will otherwise be caused according to an image height.

In any of the inventions described in the above-noted Japanese patent publications, a sub-scanning radius of curvature has a monotone change (having no inflection point). As a result, it is difficult to ensure a uniformity for an optical magnification while also correcting an image curvature. Further, if an optical system is constructed only of a lens surface which has a sub-scanning radius of curvature having a monotone change, the scanning image formation lens will require more than two lens elements. In addition, a change in the radius of curvature will become large between the vicinity of an optical axis and the peripheral areas, resulting in a problem that a lens will have a large difference in its thickness between the vicinity of the optical axis and the peripheral areas, and such a lens is difficult to make of a plastic material in an extrusion molding process.

In addition, another scanning image formation lens has a cross section in a sub-scanning direction in the vicinity of an optical axis having a biconvex shape and the sub-scanning radius of curvature has a plurality of extreme values (Japanese Unexamined Patent Publication No. 10-148755).

However, because such kind of a scanning image formation lens has a biconvex shape, it is impossible to freely set a principal point position for each image height, hence rendering it difficult to maintain a constant optical lateral magnification for each image height, resulting in a problem that the diameter of a beam spot changes.

SUMMARY OF THE INVENTION

In order to overcome the above-described and other problems, preferred embodiments of the present invention provide a scanning image formation lens constructed to correct an image curvature regardless of whether a sag condition occurs and also making it possible to form a beam spot having a uniform beam spot diameter regardless of image height.

The preferred embodiments of the present invention further provide an optical scanning apparatus capable of writing information with a beam spot having a uniform beam spot diameter regardless of image height so as to effectively perform an information writing (information recording) operation with a high recording density.

A scanning image formation lens according to preferred embodiments of the present invention includes a scanning image formation lens for use in an optical scanning apparatus in which a light beam from a light source is formed into an elongated linear image arranged in the main scanning direction and is caused to deflect at a constant velocity via a light deflecting system having a deflective reflecting surface which is located in the vicinity of an image formation position of the linear image. The deflected light beam is transmitted through the scanning image formation lens so as to be converged into a beam spot on a surface to be scanned, thereby causing the beam spot to scan the surface to be scanned at a constant speed.

Each of a main scanning direction and a sub-scanning direction should be a direction defined on the surface to be scanned. However, because there is no possibility of confusion, in the present specification, the directions corresponding to the main/sub-scanning directions on the optical path from a light source to the scanned surface are herein referred to as a main scanning direction and a sub-scanning direction, respectively.

A light deflection system in which a deflective reflecting surface and a rotating axis are not coincident with each other, thus producing a "sag", is used. In particular, the light deflection system may include a polygon mirror, a rotatable single-surface mirror or a rotatable two-surface mirror.

The scanning image formation lens preferably has at least one special surface.

The special surface is a surface in which a sub-scanning curvature changes in a main scanning direction according to a distance from an optical axis toward a periphery of the lens surface such that a line passing through centers of curvature in the sub scanning curvature is curved.

The scanning image formation lens of preferred embodiments of the present invention preferably includes at least two lens elements. Therefore, in the examples of preferred embodiments which will be described in detail later, not only is it possible to form the scanning image formation lens using two lens elements, it is also possible to form such a lens using three or more than three lens elements.

A scanning image formation lens according to a first preferred embodiment of the present invention is constructed such that at least one of the above-described special surfaces is arranged such that the change of sub-scanning curvature is non-symmetrical in the main scanning direction relative to the optical axis, and further, the sub-scanning curvature has two or more than two extreme values.

"Sub-scanning curvature" is used to mean a curvature within a certain cross section. The cross section being assumed to have been obtained by cutting through a lens along a plane that is perpendicular to the main scanning direction, in the vicinity of a lens plane having a special surface.

"The change of sub-scanning curvature is non-symmetrical in the main scanning direction relative to the optical axis" means a that a change of sub-scanning curvature in the main scanning direction does not have a symmetrical axis relative to the optical axis within the main scanning plane.

"Extreme value" is an extremely large value or an extremely small value, and under a condition where h (a distance from an optical axis) is used to represent the height of a lens in the main scanning direction, $C(h)$ is used to represent a sub-scanning curvature in relation to a lens height h, $h_0$ is used to represent a lens height where curvature differentiation $dC(h)/dh$ becomes 0, a lens height $h_0$ where curvature $C(h)$ is increasing or decreasing on both sides thereof is referred to as having "extreme value".

In general, if an optical magnification of the scanning image formation lens is maintained at a constant value, a high order curve-like image curvature is likely to occur. In particular, in an optical system having fewer lens elements, when an image height of a beam spot is H, coefficients are a, b, a sagittal image curvature (sub-scanning image curvature) of a high order curve of "$a \cdot H^2 + b \cdot H^4$" is likely to occur.

In accordance with the first preferred embodiment of the present invention, by causing the change of the sub-scanning radius of curvature of a special surface to have "a plurality of extreme values", a power of the sub-scanning direction on the lens surface is changed by the high order function with respect to the sub-scanning image curvature of the above high order curve, and thereby, the sub-scanning image curvature is properly corrected.

When a light deflection system such as a polygon mirror in which its deflective reflecting surface is not coincident with its rotation axis, the sub-scanning image curvature is likely to be deteriorated because of an influence from a sag. A sub-scanning image curvature caused under such a circumstance is likely to cause a deterioration in an image curvature of a shape expressed by an odd function of "$c \cdot H + d \cdot H^3$"+ . . . , with the coefficient being c, d, . . . In order to effectively correct such kind of a sub-scanning image curvature, a change of the above sub-scanning radius of curvature is made non-symmetrical in the main scanning direction relative to the optical axis.

In preferred embodiments of the present invention, because the scanning image formation lens preferably includes at least two lens elements, it is possible to increase a freedom when designing an optical property in the main scanning direction, such that the main scanning image curvature and a constant velocity property can be corrected properly. As a result, it is possible to perform a high density writing (information recording) operation with a high writing density, such as for example, 1200 dpi or more, which is impossible by using only one-piece lens structure.

In the scanning image formation lens as described above, the change of a sub-scanning curvature may be made non-symmetrical in the main scanning direction relative to the optical axis. Further, in a special surface where the sub-scanning curvature has two or more than two extreme values, it is possible for the sub-scanning curvature to have an extreme value in the vicinity of an optical axis.

In the scanning image formation lens according to the first preferred embodiment of the present invention, if a high order component of a sub-scanning image curvature is corrected, there is a possibility that a sub-scanning image curvature in the vicinity of an optical axis will become deteriorated. Under such a circumstance, as described above, if an extreme value is set to be in the vicinity of an optical axis of a lens having the above-described special surface, it is possible to obtain an image curvature having an excellent quality relative to an entire image height.

Moreover, in the scanning image formation lens according to preferred embodiments of the present invention, because a lens having a special surface in which the change of the sub-scanning curvature is non-symmetrical in the main scanning direction relative to the optical axis has a lens surface which is non-symmetrical in the main scanning direction relative to the optical axis, an optical axis does not have a normal rotating symmetrical axis. In the present specification, the phrase "optical axis", when used with respect to such kind of a lens having a non-symmetrical shape, means "a reference axis perpendicular to main and sub-scanning directions" in a reference coordinate system for use in determining a shape of a lens surface.

In the scanning image formation lens as described above, it is possible to have two or more than two special surfaces within the scanning image formation lens.

Even when only one "special surface" is used, it is possible to greatly reduce the sub-scanning image curvature, but it might be impossible to maintain a constant optical magnification for each image height due to a lens structure. By using two or more than two special surfaces, it will be possible to optionally change both front and rear principal point positions. As a result, a magnification with respect to each image height may be kept constant, thereby making it possible to obtain a stabilized beam stop.

In the above scanning image formation lens, it is possible that in the vicinity of an optical axis a shape within a sub-scanning cross section (which means a virtual cross section perpendicular to the main scanning direction in the vicinity of a lens) may be a "positive meniscus shape". By thus making the scanning image formation lens, with a combination of two radius of curvature of two surfaces, the principal point position of an optical system is allowed to be optionally set for each image height, thereby making it possible to constantly maintain a predetermined lateral magnification for each image height. However, in a lens having a biconvex or biconcave shape, it is impossible to greatly change a principal point position.

In the above scanning image formation lens according to preferred embodiments of the present invention, it is preferred that at least one of the extreme values possessed by a special surface in which the change of sub-scanning curvature is non-symmetrical in the main scanning direction relative to the optical axis is in a position to satisfy the following conditions:

$$|(he)/(hmax)|>0.5. \quad (1)$$

wherein, the position in the main scanning position is expressed by he and the effective lens height from an optical axis on the positive image height side or the negative image height side is expressed by hmax.

As described above, if an optical system includes only a few lens elements, a sub-scanning image curvature of a high order curve of "$a \cdot H^2 + b \cdot H^4$" is likely to occur. If such kind of a sub-scanning image curvature has an image height which can achieve "a maximum expansion position", and if such an image height is Hn and an effective writing height is Hm, it is allowed to establish a relationship as indicated in the following equation:

$$Hn=(1/\sqrt{2}) \times Hm=0.71 \times Hm \quad (7)$$

(Fumio Kondo, "Lens Design Technique (Optical Industrial Technology Society)" PP.146–148)

In order to correct an expansion in the vicinity of an effective writing height Hm=0.71, it is effective that an extreme value is set in the vicinity of a lens surface corresponding to this position. Further, if it is necessary to consider correcting a sub-scanning image curvature of a high order exceeding a fourth order, it is preferred that the position of an extreme value is in a range satisfying the above equation (1).

The above "hmax" is set to be an effective lens height on the positive side of the image height when "he≧0" and an effective lens height on the negative side of the image height when "he<0". Further, the positive side of the image height is set to be a side on which a light beam from a light source is incident on to a deflective reflecting surface.

In the above scanning image formation lens according to preferred embodiments of the present invention, if a lateral magnification on an optical axis is represented by $\beta_o$, and if a lateral magnification on any image height is represented by $\beta h$, it is preferred to satisfy the following equation:

$$0.83<|\beta h/\beta_o|<1.07 \quad (2)$$

The beam waist diameter of a beam forming a beam spot is different from place to place, varying generally in proportion to a change in a lateral magnification of image formation. For this reason, in order to obtain a stabilized beam spot having a predetermined beam spot diameter, it is important to keep constant a lateral magnification for each image height.

The lateral magnification of image formation will be determined by an image magnification of an entire optical system extending from a light source to a scanned surface. Because a change of a lateral magnification according to an image height of a beam spot depends on a change in a lateral magnification in the main scanning direction of a scanning image formation lens, if a lateral magnification of a scanning image formation lens is made to satisfy the above condition (2), it is possible to effectively prevent an undesired change in a diameter of a beam spot.

In the above scanning image formation lens according to preferred embodiments of the present invention, if an effective writing width is represented by W, a width of sub-scanning image curvature within said effective writing width is represented by Fs, it is preferred to satisfy the following equation:

$$Fs/W<0.005 \quad (3)$$

If the equation (3) is satisfied, it will be possible to sufficiently control a change of sub-scanning image curvature, thereby making it sure to effectively reduce such a change in the beam spot diameter according to the image height.

In the above scanning image formation lens of preferred embodiments of the present invention, at least a lens having a special surface may be made by a plastic material. If such a lens is formed of a plastic material, there will be a possibility that an image curvature is deteriorated due to a change in a surrounding environment during formation of the plastic lens. However, if a plastic lens is in advance designed to have a sufficiently small image curvature, an influence possibly caused by a change in the surrounding environment will be tolerable.

In the above scanning image formation lens of preferred embodiments of the present invention, a tilt and/or a shift may be provided to one or more than one lens forming the scanning image formation lens.

Further, the scanning image formation lens may contain a lens surface in which a shape within a main scanning cross section is non-symmetrical with respect to an optical axis. "Main scanning cross section" is a virtual cross section determined by the above-noted main scanning surface.

By providing the lens with a tilt and/or a shift, a deterioration in the main scanning image curvature and a deterioration in a constant velocity property, which may possibly be caused due to a sag, can be corrected.

Nevertheless, if a further higher density is required, there is a possibility that the provision of a tilt and/or a shift will be not sufficient to effect a desired correction. In particular, if a deflected light beam is a converged light beam arranged in the main scanning direction, a sag will cause a deterioration not only in the sub-scanning image curvature, but also in the main scanning image curvature and in the constant velocity property. As a result, a measure of merely providing a tilt and/or a shift will be difficult to avoid a problem that a high order aberration undesirably remains. For this reason, by including a lens surface in which a shape within a main scanning cross section is non-symmetrical with respect to an optical axis, it is possible to effectively correct a deterioration in the main scanning image curvature and a deterioration in a constant velocity property, which deteriorations may otherwise be caused due to a sag.

A scanning image formation lens according to a second preferred embodiment of the present invention is characterized in that it includes two or more than two lens elements, and has at least one special surface in which a sub-scanning curvature changes in a main scanning direction according to a distance from an optical axis toward a periphery of the lens surface such that a line passing through centers of curvature in the sub scanning curvature is curved. The at least one special surface is formed so that a change in the sub-scanning curvature is non-symmetrical in the main scanning direction relative to the optical axis and the curvature change has one or more than one inflection points.

As to the "inflection points", where h (a distance from an optical axis) is used to represent the height of a lens in the main scanning direction, C(h) is used to represent a sub-scanning curvature in relation to a lens height h, $h_1$ is used to represent a lens height when curvature secondary differentiation $d^2C(h)/dh^2$ becomes 0, a position where $dC(h)/dh$ reverses a code with $h_1$ as a bound is referred to as a reflection point.

As discussed in the above description, if an optical magnification of a lens is maintained constant, a high order curve-like image curvature is likely to occur. In particular, in an optical system having fewer lens, a sub-scanning image curvature of the shape of "$a \cdot H^2 + b \cdot H^4$" is likely to occur. In the above scanning image formation lens according to the second preferred embodiment of the present invention, if the change of the sub-scanning radius of curvature is caused to have a "inflection point", by changing a power of the sub-scanning direction on the lens surface by virtue of a high order function, the sub-scanning image curvature of the above high order curve can be properly corrected.

As in the scanning image formation lens according to the first preferred embodiment of the present invention, the sub-scanning image curvature can be corrected by rendering the change of sub-scanning curvature to have two or more than two "extreme values", and such a correction is proved to be very effective. On the other hand, even in a case where there is only one extreme value in the change of sub-scanning curvature, "an expansion of image curvature" can still be effectively reduced by using an "inflection point".

As in the scanning image formation lens according to the first preferred embodiment of the present invention, by forming the lens with two or more than two lens elements, it is possible to accomplish a high density, such as, for example, 1200 dpi or more, in information writing.

In the above scanning image formation lens according to the second preferred embodiment of the present invention, a curvature on a special surface in which the change of sub-scanning curvature is non-symmetrical in the main scanning direction relative to the optical axis and the curvature change has one or more than one inflection point can have an extreme value in the vicinity of an optical axis.

In this way, with the scanning image formation lens according to the second preferred embodiment of the present invention, although there is a possibility that, if a high order component of the sub-scanning image curvature is corrected, the sub-scanning image curvature in the vicinity of an optical axis will become worse than before the correction, by setting an extreme value in the vicinity of an optical axis of a lens having a special surface, it is sure to obtain a good image curvature extending along an entire image height, as in the scanning image formation lens according to the first preferred embodiment of the present invention.

The above scanning image formation lens according to the second preferred embodiment of the present invention is allowed to have two or more than two special surfaces.

Thus, as in the scanning image formation lens according to the first preferred embodiment of the present invention, by using two or more than two special surfaces, it is possible to optionally change both front and rear principal point positions, thereby ensuring that a magnification of each image height may be maintained constant and thus, obtaining a stabilized beam spot.

With the scanning image formation lens according to the second preferred embodiment of the present invention, in a lens which has a special surface in which the change of sub-scanning curvature is non-symmetrical in the main scanning direction relative to the optical axis and the curvature change has one or more than one inflection point, a lens shape is allowed to be a meniscus shape of positive power within the sub-scanning cross section in the vicinity of an optical axis, thereby making it possible to maintain a constant lateral magnification for each image height by optionally setting the principal point positions.

In the above scanning image formation lens according to the second preferred embodiment of the present invention, if hi is used to represent a position of at least one inflection point in the main scanning direction, and if hmax is used to represent a positive side image height or a negative side image side, it is preferred that the lens be located in a position that satisfies the following equation:

$$|(hi)/(hmax)| > 0.5. \quad (4)$$

As has been described in relation to the scanning image formation lens according to the first preferred embodiment of the present invention image, if Hn is used to represent an image height easily producing "a maximum expansion position" of a sub-scanning image curvature of a high order curve "$a \cdot H^2 + b \cdot H^4$" which is likely to occur in an optical system including only a few lens elements, since such Hn is obtainable from the above equation (7) with an effective writing height being set as Hm, correcting the expansion in the vicinity of Hm=0.71 may be effectively accomplished by setting an inflection point in the vicinity of a lens surface position corresponding to this position. Further, if it is necessary to consider correcting the sub-scanning image curvature of a high order exceeding a fourth order, it is preferred that the position of the inflection point be in a range satisfying the above equation (4). Here, "hmax" is used to represent an effective lens height on the positive image height side when "hi≧0" and is used to represent an effective lens height on the negative image height side when "hi<0".

In the above scanning image formation lens according to the second preferred embodiment of the present invention, with the same reason as in the scanning image formation lens according to the first preferred embodiment of the invention, if a lateral magnification on an optical axis is represented by $\beta_o$, and if a lateral magnification on any image height is represented by $\beta h$, it is preferred to satisfy the following equation:

$$0.93 < |\beta h/\beta o| < 1.07 \qquad (5)$$

Similarly, if an effective writing width is represented by W, a width of a sub-scanning image curvature within said effective writing width is represented by Fs, it is preferred to satisfy the following equation:

$$Fs/W < 0.005 \qquad (6)$$

Further, in the scanning image formation lens according to the second preferred embodiment of the present invention, at least a lens having a special surface may be made of a plastic material. If such a lens is formed of a plastic material, there will be a possibility that an image curvature is deteriorated due to a change in a surrounding environment. However, if a plastic lens is in advance designed to have a sufficiently small image curvature, an influence possibly caused by a change in the surrounding environment will be tolerable.

In the scanning image formation lens according to the second preferred embodiment of the present invention, a tilt and/or a shift may be provided to one or more than one lens element forming the scanning image formation lens. In this way, irrespective of the existing of the sag, it is allowed to properly correct a deterioration in the main scanning image curvature and a deterioration in a constant velocity property.

Further, the above scanning image formation lens according to the second preferred embodiment of the present invention, with the same reason as in the scanning image formation lens according to the first preferred embodiment of the present invention, it is possible to include a lens surface in which a shape within a main scanning cross section is non-symmetrical with respect to an optical axis.

An optical scanning apparatus according to preferred embodiments of the present invention is formed such that a light beam from the light source is formed into an elongated linear image arranged in the main scanning direction and is caused to deflect at a constant velocity, by virtue of a light deflecting system having a deflective reflecting surface which is located in the vicinity of an image formation position of the linear image. The deflected light beam is transmitted through a scanning image forming lens and is then effected by the scanning image formation lens to be converged into a beam spot on a scanned surface, thus causing the beam spot to scan the surface to be scanned at a constant speed. As a scanning image formation lens for use in the above-described optical scanning apparatus, it is possible to use any one of the above lenses according to any of a plurality of preferred embodiments of the present invention.

BRIEF DESCRIPTION OF THE DRAWINGS

A more complete appreciation of the present invention and many of the attendant advantages thereof will be readily obtained as the same becomes better understood by reference to the following detailed description thereof when considered in conjunction with accompanying drawings, wherein:

FIGS. 3(a), 3(b) and 3(c) are diagrams showing a relationship in Example 1 between a change of a sub-scanning curvature in a special surface of a scanning image formation lens and a change of a lateral magnification ratio in a sub-scanning direction;

FIGS. 4(a), 4(b) and 4(c) are diagrams showing a relationship in Example 2 between a change of a sub-scanning curvature in a special surface of a scanning image formation lens and change of a lateral magnification ratio in a sub-scanning direction;

FIG. 5 is a diagram showing an image curvature and constant velocity characteristics of Example 1;

FIGS. 7(a) and (b) are diagrams showing a relationship in Example 3 between a change of a sub-scanning curvature in a special surface of a scanning image formation lens and a change of a lateral magnification ratio in a sub-scanning direction;

FIGS. 8(a) and (b) are diagrams showing a relationship in Example 4 between a change of a sub-scanning curvature in a special surface of a scanning image formation lens and a change of a lateral magnification ratio in a sub-scanning direction;

FIG. 11 is a schematic drawing illustrating an optical scanning apparatus according to another preferred embodiment of the present invention;

FIGS. 18(a), 18(b), 18(c) are diagrams showing a relationship in Example 7 between a change of a sub-scanning curvature in a special surface of a scanning image formation lens and a change of a lateral magnification ratio in a sub-scanning direction; and FIG. 19 is a diagram showing an image curvature and constant velocity characteristics of Example 7.

DETAILED DESCRIPTION OF PREFERRED EMBODIMENTS

Figure 1:
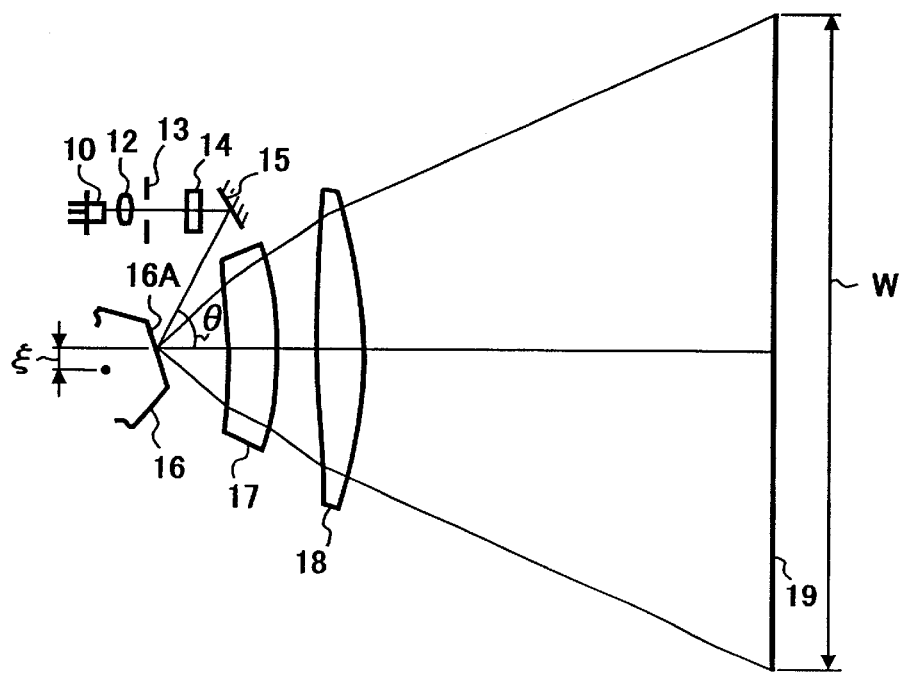
FIG. 1 is a schematic drawing illustrating an optical scanning apparatus according to a preferred embodiment of the present invention.

FIG. 1 is an explanatory view schematically illustrating a first preferred embodiment of an optical scanning apparatus according to the present invention. As shown in FIG. 1, effected by a coupling lens 12, a light beam produced from a semiconductor laser 10 serving as a "light source" is coupled by an optical system that is located after the lens 12 and before the surface to be scanned 19. Then, the light beam becomes a parallel beam, or alternatively becomes a light beam that has a weak divergence or a weak convergence. When passing through an aperture 13, some outer surrounding portions of the light beam are blocked, thereby obtaining an effect which is called "beam shaping". The light beam after having been treated in the beam shaping process, is then converged continuously in a sub-scanning direction by virtue of a cylindrical lens 14. Subsequently, the light beam is reflected by a mirror 15 and is formed into a linear image which is elongated in a main scanning direction. A polygon mirror 16 serving as a "light deflecting system" has a deflective reflecting surface 16A adjacent to an image formation position of the linear image, so as to cause a reflected light to deflect at equiangular velocity through a rotation at a constant velocity. The deflected light beam is allowed to transmit through a lens 17 and a lens 18 which define a "scanning image formation lens". Then, the light beam is effected by the "scanning image formation lens" and is converged into a beam spot on a scanned surface 19 (which is substantially a photosensitive surface of a photoconductive body), thus causing the scanned surface to be scanned at a constant speed. The "scanning image formation lens" including the lens 17 and the lens 18, as will be described in the following Examples 1 and 2, includes novel features of preferred embodiments of the present invention.

More specifically, the optical scanning apparatus of the preferred embodiment illustrated in FIG. 1 uses a scanning image formation lens according to the present invention, in which a light beam produced from a light source 10 is formed into a linear image which is elongated in a main scanning direction and is caused to be deflected at a constant velocity by virtue of a light deflecting system 16 having a deflective reflecting surface 16A which is located in the vicinity of an image formation position of the linear image. The deflected light beam is allowed to transmit through the lens 17 and the lens 18 which function as "scanning image formation lens". Then, the light beam is effected by the "scanning image formation lens" and is converged into a beam spot on a scanned surface 19, thus causing the beam spot to scan the surface to be scanned at a constant speed.

FIG. 2, 11, 14 and 17 is an explanatory view schematically illustrating another preferred embodiment of a light scanning apparatus according to the present invention. In FIG. 2, 11, 14 and 17 in order to avoid some complexity, some elements which are the same as those in FIG. 1 are represented by the same reference numerals, and the explanations thereof will be omitted.

A deflected light beam deflected by the polygonal mirror 16 serving as a "light deflecting system" is transmitted through a lens 20 and a lens 21, both of which together define a "scanning image formation lens". Then, the light beam is effected by the "scanning image formation lens" and is converged into a beam spot on a scanned surface 19, thus causing the beam spot to scan the surface to be scanned at a constant speed. The "scanning image formation lens" including the lens 20 and the lens 21, as will be described in the following Examples 3, 4, 5, 6 and 7 are made according to preferred embodiments of the present invention.

More specifically, a light scanning apparatus according to the preferred embodiment illustrated in FIG. 2, 11, 14 and 17 uses a scanning image formation lens according to the present invention. The optical scanning apparatus is constructed such that a light beam from the light source 10 is formed into a linear image which is elongated in the main scanning direction and is then caused to be deflected at a constant velocity, via a light deflecting system 16 having a deflective reflecting surface 16A which is located in the vicinity of an image formation position of the linear image. The deflected light beam is transmitted through a lens 20 and a lens 21 defining as "scanning image formation lens". Then, the light beam is effected by the "scanning image formation lens" and is converged into a beam spot on a scanned surface 19, thus causing the beam spot to scan the surface to be scanned at a constant speed.

Examples of preferred embodiments of the present invention will be now described below.

There are seven examples, Examples 1–7, in which Examples 1 and 2 are examples of the preferred embodiment illustrated in FIG. 1. As illustrated in FIG. 1, a scanning image formation lens preferably includes a first lens 17 and a second lens 18. The first lens 17 has a light incident surface (a first surface) and a light emerging surface (a second surface), both forming a coaxially arranged non-spherical configuration. If a radius of curvature on an optical axis position is R, a distance from the optical axis position is H, The non-spherical shape is expressed by the following equation:

$$X = (H^2/R)/[1+\sqrt{1-(1+K)(H/R)^2}] + A_4 \cdot H^4 + A_6 \cdot H^6 + A_8 \cdot H^8 \tag{8}$$

The second lens 18 on a scanned surface side has a "non-circular arc shape" on its surface shape within its main scanning surface. If a radius of curvature within the main scanning surface on the optical axis position is Rm, a distance from the optical axis and extending in the main scanning direction is Y, a conical constant is Km, high order coefficients are $Am_1, Am_2, Am_3, Am_4, Am_5, Am_6, \ldots$, with the optical axis direction represented by X, the non-circular arc shape is expressed by the following equation;

$$X = (Y^2/Rm)/[1+\sqrt{1-(1+Km)(Y/Rm)^2}] + Am_1 \cdot Y + Am_3 \cdot Y^3 + Am_4 \cdot Y^4 + Am_5 \cdot Y^5 + Am_6 \cdot Y^6 + \tag{9}$$

Here, a factor obtained by replacing at least one of the odd numbers $Am_1, Am_3, Am_5 \ldots$ with "a value other than zero" will have a non-symmetrical configuration in the main scanning direction relative to the optical axis.

In example 1, only even number factors in the equation (9) are used, so as to be symmetrical in the main scanning direction.

In example 2, odd number factors in the equation (9) are not zero, so as to be non-symmetrical in the main scanning direction relative to the optical axis.

In the light incident side (a third surface) and the light emerging side (a fourth surface) of the second lens 18, a radius of curvature Rs within a sub-scanning surface (its inverse number is "sub-scanning curvature") will change how Y is altered. If a radius of curvature within the sub-scanning surface on the optical axis is $Rs_0$, a higher order coefficient is $As_1, As_2, As_3, As_4, As_5 \ldots$, a sub-scanning curvature Cs may be expressed by the following equation:

$$Cs = 1/Rs = 1/(Rs_0 + As_1 \cdot Y + As_2 \cdot Y^2 + As_3 \cdot Y^3 + As_4 \cdot Y^4 + As_5 \cdot Y^5 + \ldots) \tag{10}$$

Here, a factor obtained by replacing at least one of odd numbers $As_1, As_3, As_5 \ldots$ with "a value other than zero" will produce a result that a sub-scanning curvature is non-symmetrical in the main scanning direction relative to the optical axis.

In Example 1, the sub-scanning radius of curvature on the fourth surface is preferably non-symmetrical.

In Example 2, the sub-scanning radius of curvature on the third and fourth surfaces are preferably non-symmetrical, respectively.

Figure 2:
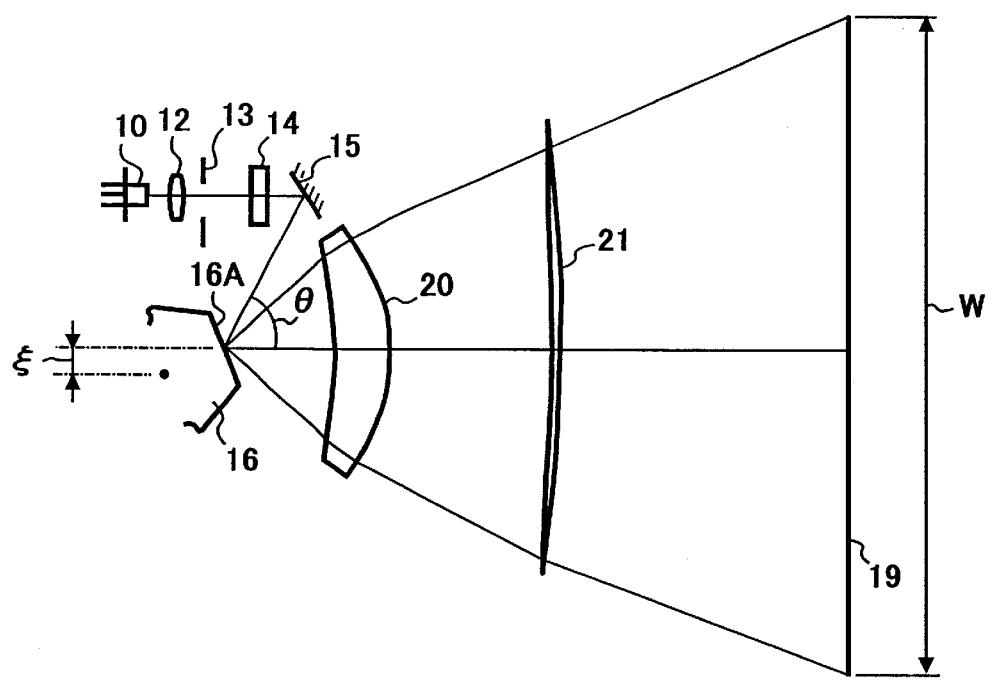
FIG. 2 is schematic drawing illustrating an optical scanning apparatus according to another preferred embodiment of the present invention.

In the optical arrangements as illustrated in FIGS. 1 and 2, if a light beam coupled by the coupling lens 12 is made to be a "light beam having a weak convergence" and if a point where the light beam is converged when the light beam is naturally converged is called a naturally converged point, the position of a naturally converged point may be used to indicate a converging extent of a coupled light.

Further, an angle θ shown in FIG. 1 and FIG. 2 is called a polygon mirror incidence angle. Moreover, in FIG. 1 and FIG. 2, a distance represented by ξ is used to indicate a center axis deviation of a polygon mirror with respect to a reference light ray (if there is not a scanning image formation lens, this means a main light ray of a deflected light beam which is perpendicular to a scanned surface).

To cope with the problem commonly referred to as sag, it is possible to provide a tilt on a lens surface. The tilt angle (unit in degrees) is represented by α, the tilt angle in the counter clockwise direction is defined as a positive angle. In Examples 1, 3, 4, 5, 6 and 7 a shift y is given to the first lens and the second lens. Such a shift is a displacement in the main scanning direction on the optical axis of a lens, with respect to the above- referenced light ray. In FIG. 1 and FIGS. 2, 11, 14 and 17 a displacement in an upward direction is defined as a shift in a positive direction. The shift y may be provided to each lens surface, and is common for a scanning image formation lens in the following examples:

EXAMPLE 1

Natural light converging point: a position which is about 700 mm from a deflective reflecting surface to a surface to be scanned.

Polygon mirror incidence angle: θ=60 degrees

The number of deflective reflecting surfaces of a polygon mirror: 6

The radius of an inscribed circle of the polygon mirror: 18 mm.

A center axis deviation ξ of the polygon mirror: 7.80 mm

Angle of view: −40.14 degrees to +40 degrees

Deflective reflecting surface (surface number: 0) of the polygon mirror has the following lens data:

| SURFACE NUMBER | Rm | Rs | x (SURFACE INTERVAL) | y | α | n (INDEX OF REFRACTION) |
|---|---|---|---|---|---|---|
| 0 | ∞ | ∞ | 26.378 | 0.881 | | |
| 1 | −100.912 | −100.912 | 18.000 | | −0.199 | 1.52441 |
| 2 | −76.404 | −76.404 | 13.062 | | −0.148 | |
| 3 | 3777.753 | 100.419 | 15.000 | | | 1.52441 |
| 4 | −159.787 | −30.031 | 143.188 | | | |

The first surface and the second surface are coaxial non-spherical surfaces, the third surface is a "special surface", and the fourth surface is "a special surface" in which the change of its sub-scanning curvature is non-symmetrical in its main scanning direction relative to the optical axis and such curvature change has one or more than one extreme value.

Various coefficients in relation to the first to fourth surfaces are listed in the following Table 1.

TABLE 1

| SURFACE NUMBER | | MAIN SCANNING DIRECTION COEFFICIENTS | | SUB-SCANNING DIRECTION COEFFICIENTS |
|---|---|---|---|---|
| 1 | K | −56.1715 | — | |
| | $A_4$ | $-2.70166 \times 10^{-6}$ | — | |
| | $A_6$ | $4.40682 \times 10^{-9}$ | — | |
| | $A_8$ | $-4.77399 \times 10^{-12}$ | — | |
| | $A_{10}$ | $-1.79288 \times 10^{-15}$ | — | |
| 2 | K | −10.63887 | — | |
| | $A_4$ | $1.60890 \times 10^{-7}$ | — | |
| | $A_6$ | $1.03293 \times 10^{-11}$ | — | |
| | $A_8$ | $-1.23550 \times 10^{-14}$ | — | |
| | $A_{10}$ | $-5.79390 \times 10^{-17}$ | — | |
| 3 | Km | −37368.48 | $As_1$ | 0 |
| | $Am_1$ | 0 | $As_2$ | $7.80898 \times 10^{-3}$ |
| | $Am_3$ | 0 | $As_3$ | 0 |
| | $Am_4$ | $-3.28785 \times 10^{-8}$ | $As_4$ | $-3.39530 \times 10{-7}$ |
| | $Am_5$ | 0 | $As_5$ | 0 |
| | $Am_6$ | $-3.26916 \times 10^{-12}$ | $As_6$ | $-2.99591 \times 10^{-9}$ |
| | $Am_7$ | 0 | $As_7$ | 0 |
| | $Am_8$ | $-4.64725 \times 10^{-16}$ | $As_8$ | $1.52592 \times 10^{-12}$ |
| | $Am_9$ | 0 | $As_9$ | 0 |
| | $Am_{10}$ | $-4.05410 \times 10^{-19}$ | $As_{10}$ | $1.27263 \times 10^{-15}$ |
| 4 | Km | −1.05973 | $As_1$ | 0 |
| | $Am_1$ | 0 | $As_2$ | $-8.18951 \times 10^{-4}$ |
| | $Am_3$ | 0 | $As_3$ | $5.55816 \times 10^{-6}$ |
| | $Am_4$ | $-7.33711 \times 10^{-7}$ | $As_4$ | $-5.39270 \times 10^{-7}$ |
| | $Am_5$ | 0 | $As_5$ | $-3.32045 \times 10^{-10}$ |
| | $Am_6$ | $1.72255 \times 10^{-10}$ | $As_6$ | $1.71390 \times 10^{-10}$ |
| | $Am_7$ | 0 | $As_7$ | $-3.52018 \times 10^{-13}$ |
| | $Am_8$ | $-3.47277 \times 10^{-14}$ | $As_8$ | $2.19887 \times 10^{-14}$ |
| | $Am_9$ | 0 | $As_9$ | $-3.56625 \times 10^{-17}$ |
| | $Am_{10}$ | $2.55052 \times 10^{-18}$ | $As_{10}$ | $4.52757 \times 10^{-17}$ |

FIG. 3(a) indicates a change of a sub-scanning curvature on the third surface,

FIG. 3(b) indicates a change of a sub-scanning curvature on the fourth surface. As shown in FIG. 3(b), the fourth surface is "a special surface" in which the change of its sub-scanning curvature is non-symmetrical in its main scanning direction relative to the optical axis and such curvature change has three extreme values (and two inflection points), with one of the extreme values being close to the optical axis thereof.

FIG. 3(c) indicates a change of a lateral magnification according to the image height in the sub-scanning direction of a scanning image formation lens in Example 1. As shown in FIG. 3(c), the lateral magnification changes only slightly when the image height changes, thereby satisfying the condition (2).

The value of |(he)/(hmax)|, a parameter of the condition (1), on points a, b, and c in FIG. 3(b) are as follows:

Point a: |(−38.5)/(−43.3)|=0.89

Point b: |(0)/(44.8)|=0

Point c: |(+37.5)/(+44.8)|=0.84

The condition (1) is satisfied by two extreme values of point a and point c.

The value of Fs/W, a parameter of the condition (3), is 0.798/210=0.0038, thereby satisfying the condition (3).

EXAMPLE 2

Natural light converging point: a position which is about 700 mm from a deflective reflecting surface to a scanned surface Polygon mirror incidence angle: θ=60 degrees The number of deflective reflecting surfaces of the polygon mirror: 6

The semi-diameter of an inscribed circle of the polygon mirror: 18 mm.

A center axis deviation of the polygon mirror ξ: 7.80 mm
Angle of view: −39.95 degrees to +40.07 degrees
Deflective reflecting surface (surface number: 0) of the polygon mirror has the lowing lens data:

| SURFACE NUMBER | Rm | Rs | x (SURFACE INTERVAL) | y | α | n (INDEX OF REFRACTION) |
|---|---|---|---|---|---|---|
| 0 | ∞ | ∞ | 26.150 | 0 | | |
| 1 | −100.912 | −100.912 | 18.000 | | 0 | 1.52441 |
| 2 | −76.404 | −76.404 | 13.062 | | 0 | |
| 3 | 2895.637 | 100.694 | 15.000 | | | 1.52441 |
| 4 | −163.649 | −29.884 | 143.188 | | | |

The first surface and the second surface are coaxial "non-spherical surfaces," the third surface and the fourth surface are "a special surface" in which the change of its sub-scanning curvature is non-symmetrical in its main scanning direction relative to the optical axis and such curvature change has one or more than one extreme value, respectively, and further, a shape within a main scanning cross section is non-symmetrical with respect to an optical axis.

Various coefficients in relation to the above first to fourth surfaces are listed in the following Table 2.

TABLE 2

| SURFACE NUMBER | | MAIN SCANNING DIRECTION COEFFICIENTS | | SUB-SCANNING DIRECTION COEFFICIENTS |
|---|---|---|---|---|
| 1 | K | −56.1715 | — | |
| | $A_4$ | −2.70166 × $10^{-6}$ | — | |
| | $A_6$ | 4.40682 × $10^{-9}$ | — | |
| | $A_8$ | −4.77399 × $10^{-12}$ | — | |
| | $A_{10}$ | 1.79288 × $10^{-15}$ | — | |
| 2 | K | −10.63887 | — | |
| | $A_4$ | −1.60890 × $10^{-7}$ | — | |
| | $A_6$ | 1.03293 × $10^{-11}$ | — | |
| | $A_8$ | −1.23550 × $10^{-14}$ | — | |
| | $A_{10}$ | −5.79390 × $10^{-17}$ | — | |
| 3 | Km | −9999.69 | $As_1$ | 6.63925 × $10^{-3}$ |
| | $Am_1$ | 0 | $As_2$ | 9.26747 × $10^{-3}$ |
| | $Am_3$ | 3.77254 × $10^{-6}$ | $As_3$ | 4.30327 × $10^{-5}$ |
| | $Am_4$ | −9.99983 × $10^{-8}$ | $As_4$ | −9.85971 × $10^{-7}$ |
| | $Am_5$ | −2.08620 × $10^{-9}$ | $As_5$ | 0 |
| | $Am_6$ | 1.70331 × $10^{-11}$ | $As_6$ | −2.91802 × $10^{-10}$ |
| | $Am_7$ | 2.29690 × $10^{-13}$ | $As_7$ | 6.14404 × $10^{-12}$ |
| | $Am_8$ | 5.02415 × $10^{-15}$ | $As_8$ | −1.06038 × $10^{-14}$ |
| | $Am_9$ | 0 | $As_9$ | 0 |
| | $Am_{10}$ | −1.09977 × $10^{-18}$ | $As_{10}$ | −9.94530 × $10^{-17}$ |
| 4 | Km | −1.11194 | $As_1$ | 1.07581 × $10^{-2}$ |
| | $Am_1$ | 0 | $As_2$ | −1.15336 × $10^{-3}$ |
| | $Am_3$ | 3.29618 × $10^{-6}$ | $As_3$ | 9.43737 × $10^{-7}$ |
| | $Am_4$ | −7.88724 × $10^{-7}$ | $As_4$ | 1.39953 × $10^{-7}$ |
| | $Am_5$ | −1.00602 × $10^{-9}$ | $As_5$ | 0 |
| | $Am_6$ | 1.83240 × $10^{-10}$ | $As_6$ | −1.23620 × $10^{-11}$ |
| | $Am_7$ | −9.59524 × $10^{-14}$ | $As_7$ | 1.67500 × $10^{-12}$ |
| | $Am_8$ | −3.59628 × $10^{-14}$ | $As_8$ | −2.19211 × $10^{-14}$ |
| | $Am_9$ | 0 | $As_9$ | 0 |
| | $Am_{10}$ | 4.84486 × $10^{-18}$ | $As_{10}$ | −1.21017 × $10^{-17}$ |

FIG. 4(a) indicates a change of a sub-scanning curvature on the third surface, FIG. 4(b) indicates a change of a sub-scanning curvature on the fourth surface. As shown in FIG. 4(a), the third surface is "a special surface" in which the change of its sub-scanning curvature is non-symmetrical in its main scanning direction relative to the optical axis and such curvature change has one extreme value near an optical axis, and has another extreme value on the minus side of image height.

FIG. 4(c) indicates a change of a lateral magnification according to the image height in the sub-scanning direction of a scanning image formation lens in Example 2. As shown in FIG. 4(c), the lateral magnification changes only slightly when the image height changes, thereby satisfying the condition (2).

The value of |(he)/(hmax)|, a parameter of the condition (1), on points a, b in FIG. 4(a) are as follows;

Point a: |(−36)/(−44.9)|=0.80

Point b: |(0)/(44.9)|=0

The condition(1)is satisfied by an extreme value at point a.

The value of Fs/W, a parameter of the condition (3), is 0.027/210=0.0001, thereby satisfying condition (3).

Figure 6:
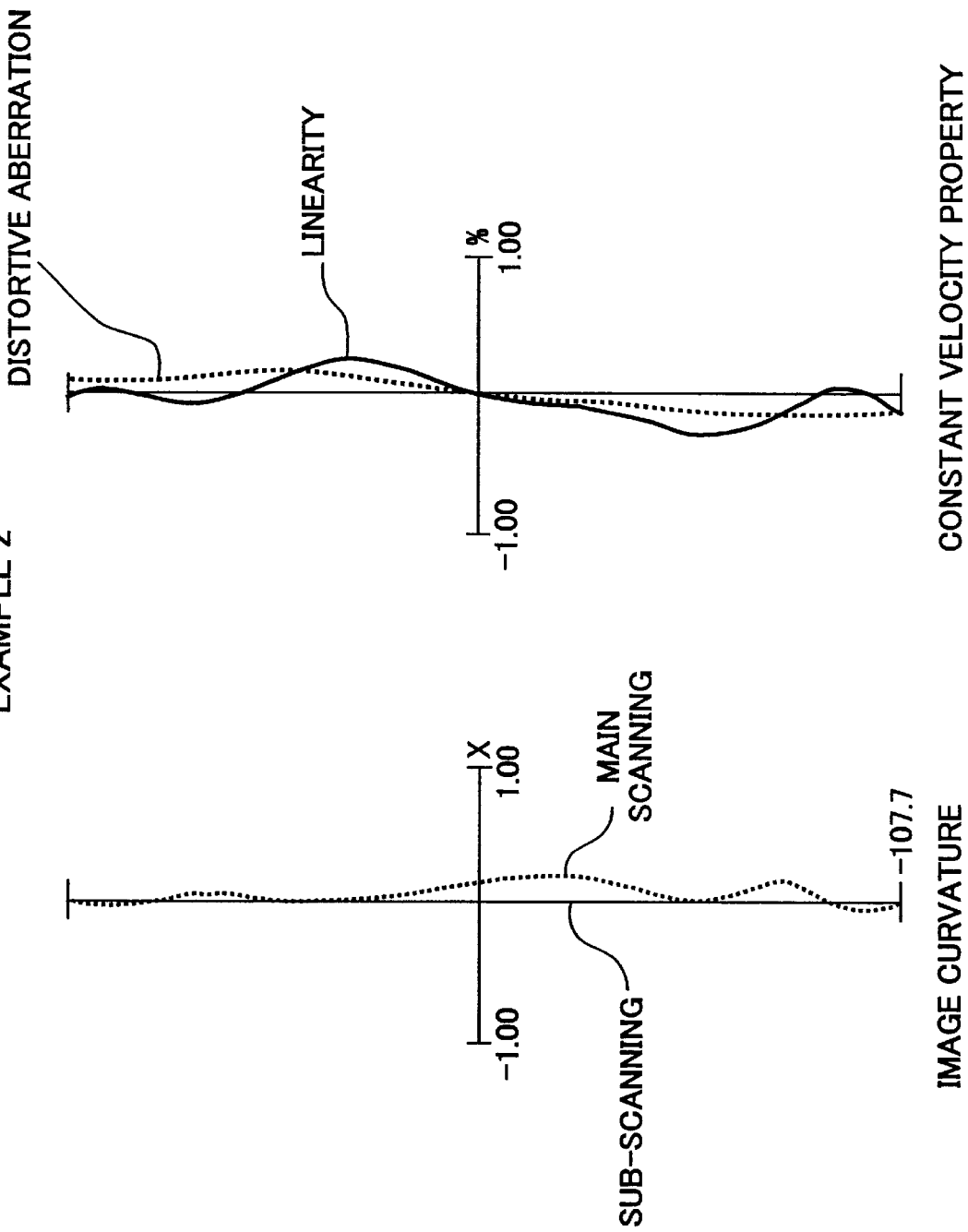
FIG. 6 is a diagram showing an image curvature and constant velocity characteristics of Example 2.

FIG. 5 and FIG. 6 indicate an image curvature property and a constant velocity property in relation to the above-described Example 1 and Example 2. "Distortive aberration" in a figure in relation to a constant velocity property usually corresponds to an fθ property. In both Example 1 and Example 2, it can be seen that the image curvature in the sub-scanning direction has been corrected in an extremely satisfactory manner, and the constant velocity property is also excellent.

Examples 3 and 4, which will be described in the following paragraphs, are related to the preferred embodiment shown in FIG. 2. In detail, Example 3 relates to a first aspect of the invention, while Example 4 relates to the second aspect of the invention.

The first surface of the first lens 20 is preferably a coaxial non-spherical surface and is represented in the above-noted equation (8).

The second surface and the third surface of the scanning image formation lens, i.e., the light emerging side of the first lens 20 and the light incident side of the second lens 21, have a surface shape in the main scanning surface, which forms a non-circular arc shape, as indicated by the above-noted equation (9). In both of Example 3 and Example 4, the shapes within the main scanning surfaces of the second and third surfaces use only the items of an even number order, so that they are symmetrical with respect to an X axis which is an optical axis in the main scanning direction.

The second and third surfaces of the scanning image formation lens has such a shape in which a radius of curvature Rs within the sub-scanning surface changes along an axis Y in the main scanning direction. If a sub-scanning curvature is Cs(Y), a curvature within the sub-scanning surface containing the optical axis is $Cs_0$, higher order coefficients are respectively $As_1, As_2, As_3, As_4, As_5 \ldots$, the shape may be expressed by the following equation:

$$Cs = Cs_0 + As_1 \cdot Y + As_2 \cdot Y^2 + As_3 \cdot Y^3 + As_4 \cdot Y^4 + As_5 \cdot Y^5 + \quad (11)$$

The equation (11) is different from the equation (10) in that they have different phenomenon in relation to a curvature. In both Example 3 and Example 4, a sub-scanning curvature of the second surface thereof is symmetrical with respect to Y=0 (the items of odd number order in the equation (11) are all 0), and the third surface is a special surface having a sub-scanning curvature which is non-symmetrical in the Y direction.

EXAMPLE 3

Natural light converging point: ∞ (A light beam coupled by the coupling lens becomes a parallel light beam)

Polygon mirror incidence angle: θ=60 degrees

The number of deflective reflecting surfaces of the polygon mirror: 6

The radius of an inscribed circle of the polygon mirror: 13 mm.

A center axis deviation ξ of the polygon mirror: 5.22 mm

Angle of view: −42 degrees to +42 degrees

Deflective reflecting surface (surface number: 0) of the polygon mirror has the following lens data:

| SURFACE NUMBER | Rm | Rs | x (SURFACE INTERVAL) | Y | n (INDEX OF REFRACTION) |
|---|---|---|---|---|---|
| 0 | ∞ | ∞ | 52.390 | 1.588 | |
| 1 | −312.597 | −312.597 | 31.400 | | 1.52716 |
| 2 | −82.915 | −82.238 | 78.0 | | |
| 3 | −500.00 | −47.55 | 3.5 | | 1.52716 |
| 4 | −1000.00 | −23.38 | 143.377 | | |

The first surface is a "coaxial non-spherical surface", the second surface is a "special surface", the third surface is "a special surface in which the change of its sub-scanning curvature is non-symmetrical in the main scanning direction relative to the optical axis and such curvature change has one or more than one extreme value", and the fourth surface is "a normal toroidal surface".

Various coefficients in relation to the above first to third surfaces are listed in the following Table 3:

TABLE 3

| SURFACE NUMBER | | MAIN SCANNING DIRECTION COEFFICIENTS | | SUB-SCANNING DIRECTION COEFFICIENTS |
|---|---|---|---|---|
| 1 | K | 2.66713 | — | |
| | $A_4$ | $1.78574 \times 10^{-7}$ | — | |
| | $A_6$ | $-1.08065 \times 10^{-12}$ | — | |
| | $A_8$ | $-3.18123 \times 10^{-14}$ | — | |
| | $A_{10}$ | $3.74031 \times 10^{-18}$ | — | |
| 2 | K | $1.983 \times 10^{-2}$ | $As_2$ | $-4.10294 \times 10^{-7}$ |
| | $A_4$ | $2.50305 \times 10^{-7}$ | $As_4$ | $-3.83294 \times 10^{-10}$ |
| | $A_6$ | $9.60583 \times 10^{-12}$ | $As_6$ | $1.39817 \times 10^{-13}$ |
| | $A_8$ | $4.54468 \times 10^{-15}$ | $As_8$ | $-5.40513 \times 10^{-17}$ |
| | $A_{10}$ | $-3.0343 \times 10^{-18}$ | $As_{10}$ | $-6.79180 \times 10^{-21}$ |
| | | | $As_{12}$ | $6.09002 \times 10^{-24}$ |
| | | | $As_{14}$ | $8.08826 \times 10^{-28}$ |
| | | | $As_{16}$ | $-1.65734 \times 10^{-32}$ |
| | | | $As_{18}$ | $-1.85397 \times 10^{-34}$ |
| 3 | Km | $-7.17319 \times 10$ | $As_1$ | $-2.24822 \times 10^{-6}$ |
| | $A_4$ | $4.32558 \times 10^{-8}$ | $As_2$ | $-7.72236 \times 10^{-7}$ |
| | $A_6$ | $-5.97293 \times 10^{-13}$ | $As_3$ | $5.34836 \times 10^{-10}$ |
| | $A_8$ | $-1.28192 \times 10^{-18}$ | $As_4$ | $7.24644 \times 10^{-11}$ |
| | $A_{10}$ | $5.72965 \times 10^{-21}$ | $As_5$ | $-3.61945 \times 10^{-14}$ |
| | | | $As_6$ | $-3.60044 \times 10^{-16}$ |
| | | | $As_7$ | $-1.11656 \times 10^{-18}$ |
| | | | $As_8$ | $-3.93720 \times 10^{-19}$ |
| | | | $As_9$ | $6.09979 \times 10^{-24}$ |
| | | | $As_{10}$ | $3.06503 \times 10^{-23}$ |
| | | | $As_{11}$ | $8.17285 \times 10^{-27}$ |
| | | | $As_{12}$ | $-1.63785 \times 10^{-28}$ |
| | | | $As_{13}$ | $1.19167 \times 10^{-30}$ |
| | | | $As_{14}$ | $-1.34065 \times 10^{-32}$ |
| | | | $As_{15}$ | $7.00676 \times 10^{-35}$ |
| | | | $As_{16}$ | $-2.29869 \times 10^{-36}$ |
| | | | $As_{17}$ | $-9.73135 \times 10^{-39}$ |
| | | | $As_{18}$ | $-2.63409 \times 10^{-40}$ |

FIG. 7(a) indicates a change of a sub-scanning curvature on the third surface. The third surface is "a special surface" in which the change of its sub-scanning curvature is non-symmetrical in its main scanning direction relative to the optical axis and such curvature change has three extreme values (and has four inflection points), and one of the extreme values is near an optical axis.

FIG. 7(b) indicates a change of a lateral magnification according to the image height in the sub-scanning direction of a scanning image formation lens in Example 3. As shown in FIG. 7(b), the lateral magnification changes only slightly when the image height changes, thereby satisfying condition (2).

The value of Fs/W, a parameter of the condition (3), is 0.203/320=0.0006, thereby satisfying the condition (3).

The value of |(he)/(hmax)|, a parameters of the condition (1), on points b, and c in FIG. 7(a), are as follows:

Point b: |(+87.5)/(+106)|=0.83

Point c: |(+97.5)/(+106)|=0.92

The condition (1) is satisfied by the above extreme values.

EXAMPLE 4

Natural light converging point: ∞ (A light beam coupled by the coupling lens becomes a parallel light beam)

Polygon mirror incidence angle: θ=60 degrees

The number of deflective reflecting surfaces of polygon mirror: 6

The radius of an inscribed circle of the polygon mirror: 13 mm.

A center axis deviation ξ of the polygon mirror: 5.22 mm

Angle of view: −42 degrees to +42 degrees

Deflective reflecting surface (surface number: 0) of the polygon mirror has the following lens data:

| SURFACE NUMBER | Rm | Rs | x (SURFACE INTERVAL) | y | n (INDEX OF REFRACTION) |
|---|---|---|---|---|---|
| 0 | ∞ | ∞ | 52.390 | 1.588 | |
| 1 | −312.597 | −312.597 | 31.4 | | 1.52716 |
| 2 | −82.951 | 103.860 | 78.0 | | |
| 3 | −500.0 | −63.270 | 3.50 | | 1.52716 |
| 4 | −1000. | −23.38 | 143.377 | | |

The first surface is a "coaxial non-spherical surface", the second surface is a "special surface", the third surface is "a special surface in which the change of its sub-scanning curvature is non-symmetrical in its main scanning direction relative to the optical axis and such curvature change has one or more than one inflection point", and the fourth surface is "a normal toroidal surface."

Various coefficients in relation to the above first to third surfaces are listed in the following Table 4:

TABLE 4

| SURFACE NUMBER | | MAIN SCANNING DIRECTION COEFFICIENTS | | SUB-SCANNING DIRECTION COEFFICIENTS |
|---|---|---|---|---|
| 1 | K | 2.66713 | — | |
| | $A_4$ | $1.78574 \times 10^{-7}$ | — | |
| | $A_6$ | $-1.08065 \times 10^{-12}$ | — | |
| | $A_8$ | $-3.18123 \times 10^{-14}$ | — | |
| | $A_{10}$ | $3.74031 \times 10^{-18}$ | — | |
| 2 | K | $1.983 \times 10^{-2}$ | $As_2$ | $4.78905 \times 10^{-7}$ |
| | $A_4$ | $2.50305 \times 10^{-7}$ | $As_4$ | $-1.19725 \times 10^{-9}$ |
| | $A_6$ | $9.60583 \times 10^{-12}$ | $As_6$ | $2.53540 \times 10^{-13}$ |
| | $A_8$ | $4.54468 \times 10^{-16}$ | $As_8$ | $8.10460 \times 10^{-18}$ |
| | $A_{10}$ | $-3.0343 \times 10^{-18}$ | $As_{10}$ | $-9.58501 \times 10^{-21}$ |
| | | | $As_{12}$ | $4.59619 \times 10^{-24}$ |
| | | | $As_{14}$ | $1.01334 \times 10^{-27}$ |

TABLE 4-continued

| SURFACE NUMBER | MAIN SCANNING DIRECTION COEFFICIENTS | | SUB-SCANNING DIRECTION COEFFICIENTS | |
|---|---|---|---|---|
| | | | $As_{16}$ | $1.90750 \times 10^{-31}$ |
| | | | $As_{18}$ | $-2.88496 \times 10^{-34}$ |
| 3 | Km | $-7.17319 \times 10$ | $As_1$ | $2.26011 \times 10^{-6}$ |
| | $A_4$ | $4.32558 \times 10^{-6}$ | $As_2$ | $-9.76490 \times 10^{-7}$ |
| | $A_6$ | $-5.97293 \times 10^{-12}$ | $As_3$ | $5.60317 \times 10^{-10}$ |
| | $A_8$ | $-1.28192 \times 10^{-16}$ | $As_4$ | $6.80388 \times 10^{-11}$ |
| | $A_{10}$ | $5.72965 \times 10^{-21}$ | $As_5$ | $-5.42103 \times 10^{-14}$ |
| | | | $As_6$ | $6.46173 \times 10^{-16}$ |
| | | | $As_7$ | $-1.05208 \times 10^{-19}$ |
| | | | $As_8$ | $-3.38758 \times 10^{-19}$ |
| | | | $As_9$ | $2.16781 \times 10^{-22}$ |
| | | | $As_{10}$ | $2.33450 \times 10^{-23}$ |
| | | | $As_{11}$ | $8.29323 \times 10^{-27}$ |
| | | | $As_{12}$ | $-5.54473 \times 10^{-28}$ |
| | | | $As_{13}$ | $6.21968 \times 10^{-32}$ |
| | | | $As_{14}$ | $-3.27632 \times 10^{-32}$ |
| | | | $As_{15}$ | $-2.07826 \times 10^{-34}$ |
| | | | $As_{16}$ | $-1.415017 \times 10^{-36}$ |
| | | | $As_{17}$ | $1.22164 \times 10^{-38}$ |
| | | | $As_{18}$ | $1.15457 \times 10^{-40}$ |

FIG. 8(a) indicates a change of a sub-scanning curvature on the third surface. The third surface is "a special surface" in which the change of its sub-scanning curvature is non-symmetrical in its main scanning direction relative to the optical axis and such curvature change has one extreme value and four inflection points.

FIG. 8(b) indicates a change of a lateral magnification according to the image height in the sub-scanning direction of a scanning image formation lens in Example 4. As shown in the FIG. 8(b), the lateral magnification changes only slightly when the image height changes, thereby satisfying the condition (5).

The value of $|(hi)/(hmax)|$, a parameters of the condition (4), at inflection points A, B, C and D in FIG. 8 (b), are as follows;

Point A: $|(-91.5)/(-106)|=0.88$

Point B: $|(-50.5)/(-106)|=0.48$

Point C: $|(+49.5)/(+106)|=0.47$

Point D: $|(+94)/(+106)|=0.89$

The condition (4) is satisfied by the above two inflection points A, D.

The value of Fs/W, a parameter of the condition (6), is $0.266/320=0.0008$, thereby satisfying the condition (6).

Figure 9:
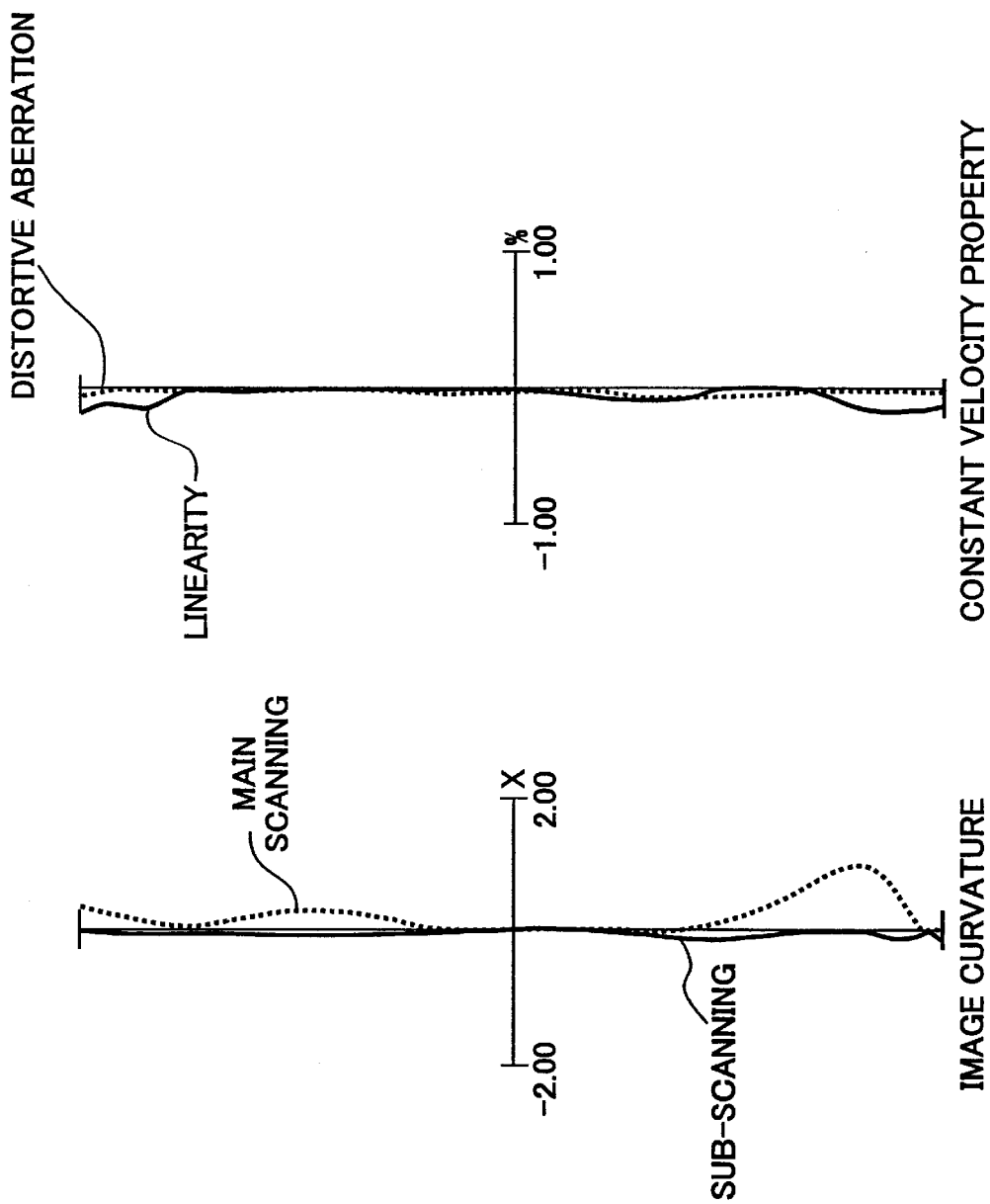
FIG. 9 is a diagram showing an image curvature and constant velocity characteristics of Example 3.
Figure 10:
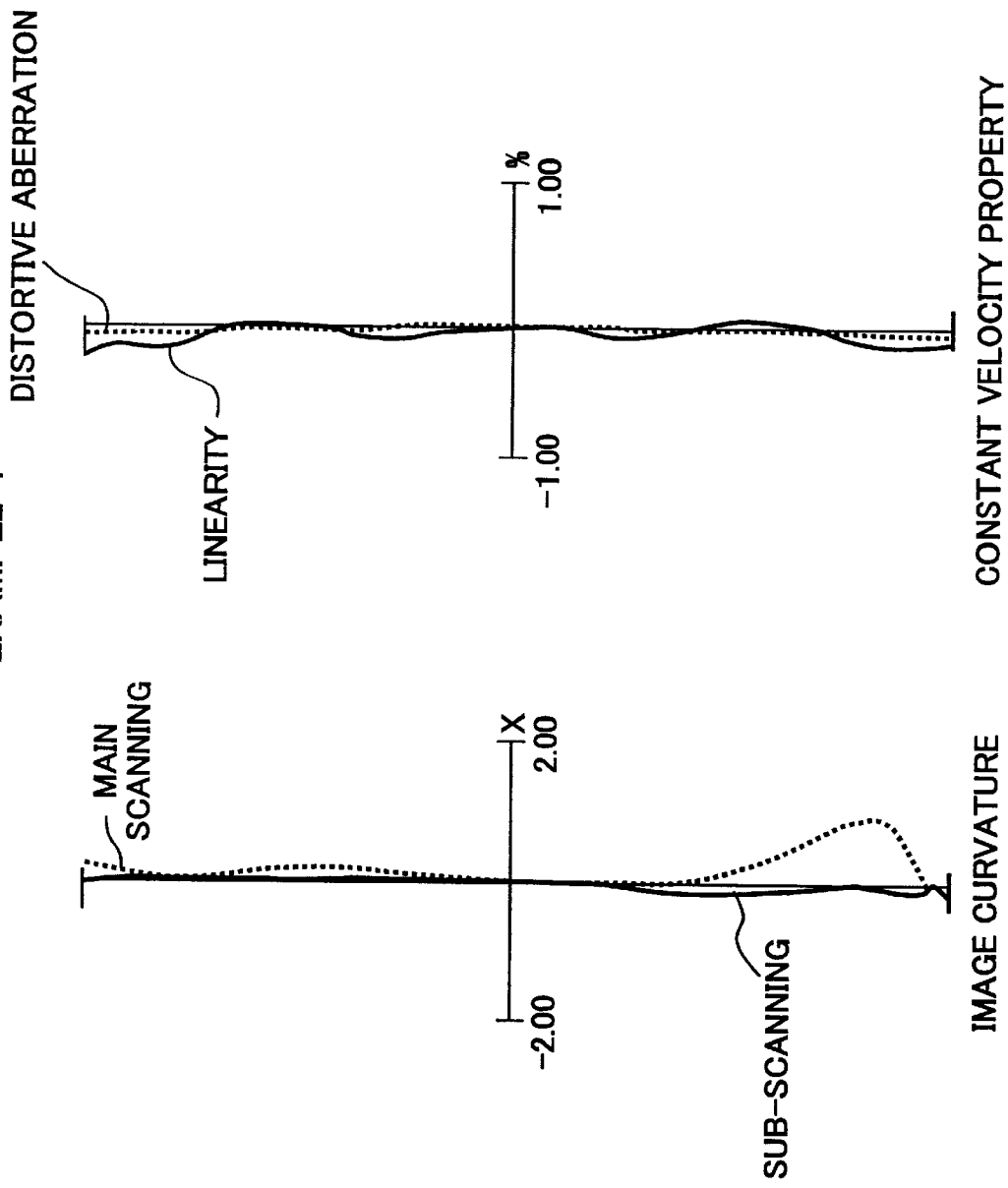
FIG. 10 is a diagram showing an image curvature and constant velocity characteristics of Example 4.

FIG. 9 and FIG. 10 indicate an image curvature property and a constant velocity property in relation to the above Example 3 and Example 4. In both Example 3 and Example 4, it can be seen that the image curvature in both the main scanning direction and the sub-scanning direction has been corrected extremely accurately and the velocity property is also excellent.

Figure 14:
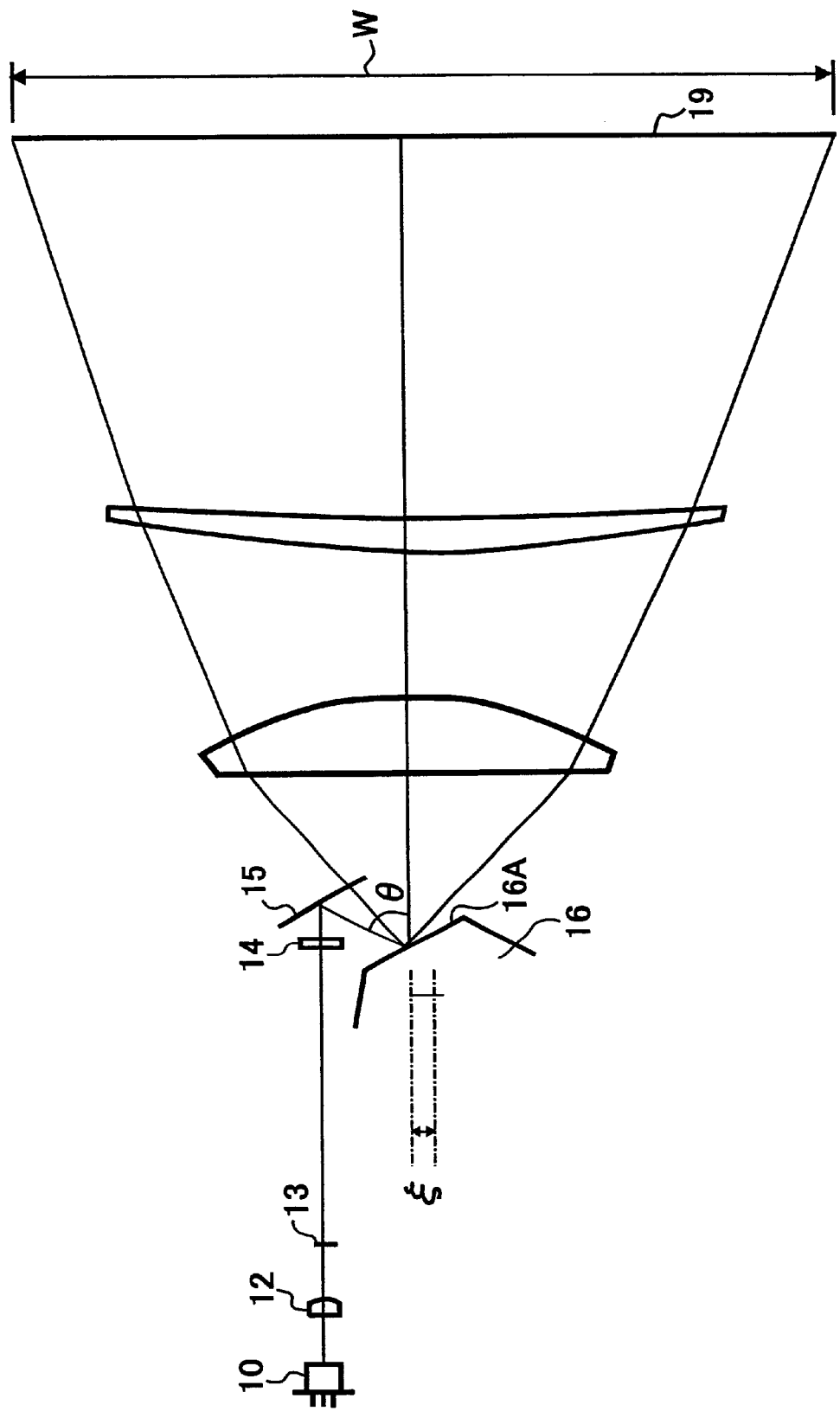
FIG. 14 is a schematic drawing illustrating an optical scanning apparatus according to another preferred embodiment of the present invention.
Figure 17:
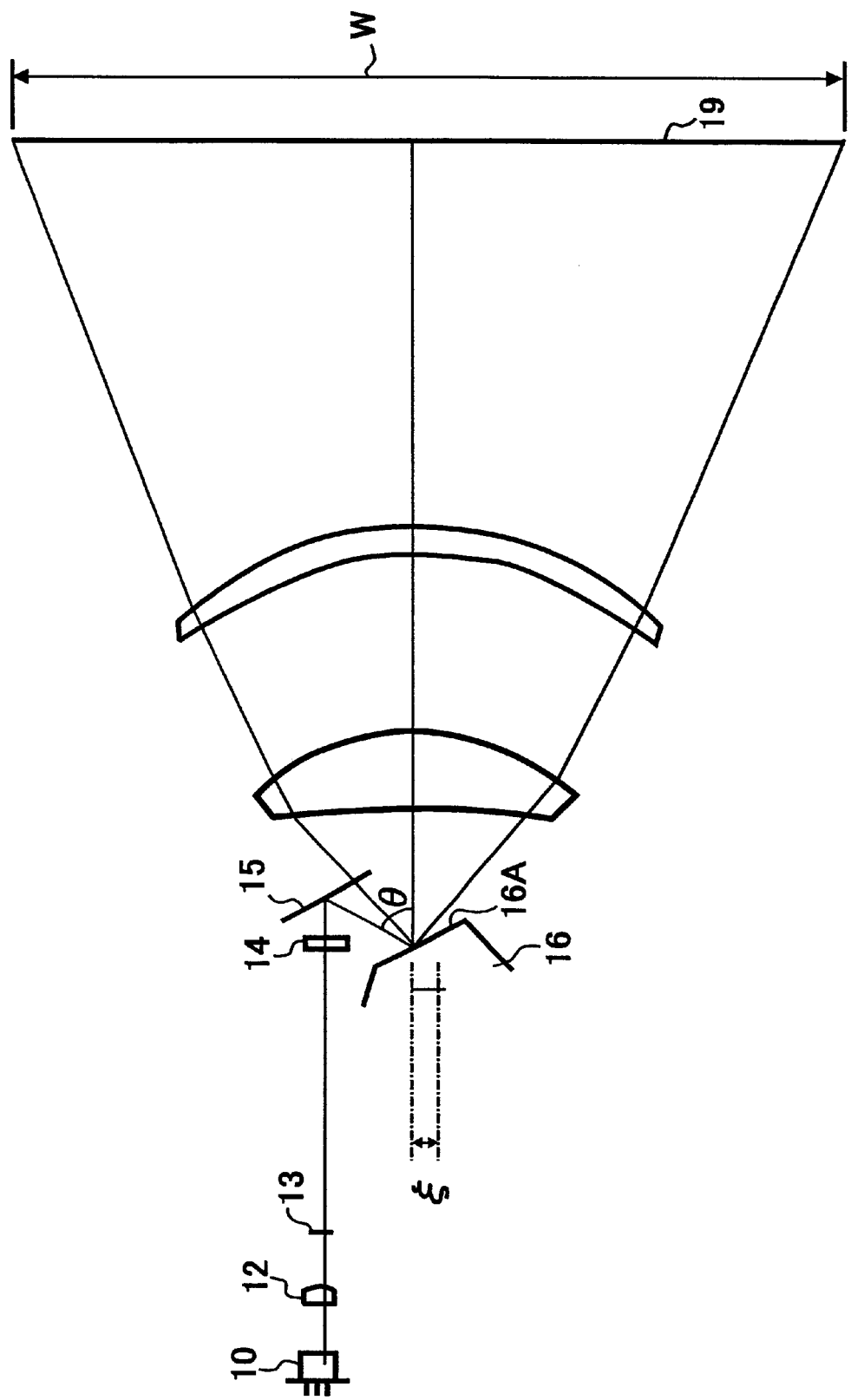
FIG. 17 is a schematic drawing illustrating an optical scanning apparatus according to another preferred embodiment of the present invention.

Examples 5, 6 and 7, which will be described in the following paragraphs, are related to the preferred embodiment shown in FIG. 11, FIG. 14 and FIG. 17.

The first surface, the second surface, the third surface and the fourth surface, i.e., the light incident side of the first lens 20, the light emerging side of the first lens 20, the light incident side of the second lens 21 and the light emerging side of the second lens 21, have a surface shape in main scanning surface, which forms a non-circular arc shape, as indicated by the above-noted equation (9). In all of Example 5, Example 6 and Example 7, the shape within the main scanning surfaces of all surfaces of "scanning image formation lens" use only the items of an even number order, so that they are symmetrical with respect to an X axis which is an optical axis in the main scanning direction.

All surfaces of "scanning image formation lens" has such a shape in which a radius of curvature Rs within the sub-scanning surface changes along an axis Y in the main scanning direction, as indicated by the above-noted equation (11).

EXAMPLE 5

Natural light converging point: ∞ (A light beam coupled by the coupling lens becomes a parallel light beam)

Polygon mirror incidence angle: θ=60 degrees

The number of deflective reflecting surfaces of the polygon mirror: 5

The radius of an inscribed circle of the polygon mirror: 25 mm.

A center axis deviation ξ of the polygon mirror: 7.18 mm

Angle of view: −42 degrees to +42 degrees

Deflective reflecting surface (surface number: 0) of the polygon mirror has the following lens data:

| SURFACE NUMBER | Rm | Rs | x (SURFACE INTERVAL) | Y | n (INDEX OF REFRACTION) |
|---|---|---|---|---|---|
| 0 | ∞ | ∞ | 65.688 | 0.297 | |
| 1 | −1398.79 | −89.949 | 33.099 | | 1.52718 |
| 2 | −112.306 | −44.269 | 74.862 | 0.027 | |
| 3 | −209.503 | −56.153 | 18.000 | | 1.52718 |
| 4 | −183.389 | −30.932 | 144.163 | | |

The first surface and the fourth surface are "special surfaces," the second surface and the third surface are "special surface in which the change of its sub-scanning curvature is non-symmetrical in the main scanning direction relative to the optical axis and such curvature change has one or more than one extreme value and one or more than one inflection point."

Various coefficients in relation to the above first to fourth surfaces are listed in the following Table 5:

TABLE 5

| SURFACE NUMBER | MAIN SCANNING DIRECTION COEFFICIENTS | | SUB-SCANNING DIRECTION COEFFICIENTS | |
|---|---|---|---|---|
| 1 | Km | $2.20147E + 02$ | $As_2$ | $-4.61932E - 06$ |
| | $Am_4$ | $-2.26422E - 08$ | $As_4$ | $-8.91118E - 12$ |
| | $Am_6$ | $6.74798E - 13$ | $As_6$ | $1.37510E - 13$ |
| | $Am_8$ | $2.55840E - 15$ | $As_8$ | $-1.37026E - 17$ |
| | $Am_{10}$ | $-3.00580E - 19$ | $As_{10}$ | $-5.51704E - 22$ |
| | $Am_{12}$ | $1.81258E - 23$ | | |
| | $Am_{14}$ | $-4.77383E - 29$ | | |
| 2 | Km | $-4.68997E - 02$ | $As_1$ | $3.92812E - 06$ |
| | $Am_4$ | $3.72692E - 08$ | $As_2$ | $-8.77741E - 07$ |
| | $Am_6$ | $1.38656E - 12$ | $As_3$ | $2.15942E - 10$ |
| | $Am_8$ | $6.77648E - 16$ | $As_4$ | $-2.06422E - 10$ |
| | $Am_{10}$ | $1.22349E - 19$ | $As_5$ | $-5.30498E - 13$ |
| | $Am_{12}$ | $7.50074E - 24$ | $As_6$ | $-1.85585E - 14$ |
| | $Am_{14}$ | $-2.47820E - 28$ | $As_7$ | $2.56860E - 16$ |
| | | | $As_8$ | $5.41284E - 18$ |
| | | | $As_9$ | $-4.79336E - 20$ |
| | | | $As_{10}$ | $-1.94294E - 21$ |
| | | | $As_{11}$ | $5.16973E - 24$ |
| | | | $As_{12}$ | $5.43660E - 25$ |
| | | | $As_{13}$ | $-3.19057E - 28$ |
| | | | $As_{14}$ | $1.55217E - 29$ |

TABLE 5-continued

| SURFACE NUMBER | MAIN SCANNING DIRECTION COEFFICIENTS | | SUB-SCANNING DIRECTION COEFFICIENTS | |
|---|---|---|---|---|
| 3 | Km | 2.08226E − 01 | $As_1$ | 3.14844E − 06 |
|   | $Am_4$ | −1.34362E − 08 | $As_2$ | 1.01109E − 06 |
|   | $Am_6$ | −6.33468E − 14 | $As_3$ | 1.29240E − 10 |
|   | $Am_8$ | 2.64185E − 17 | $As_4$ | 5.85563E − 11 |
|   | $Am_{10}$ | 1.35988E − 20 | $As_5$ | −9.74361E − 14 |
|   | $Am_{12}$ | −6.40388E − 25 | $As_6$ | −1.80411E − 15 |
|   | $Am_{14}$ | 4.58839E − 30 | $As_7$ | 1.55502E − 17 |
|   | $Am_{16}$ | 4.03431E − 35 | $As_8$ | 1.42862E − 19 |
|   |   |   | $As_9$ | −8.05137E − 22 |
|   |   |   | $As_{10}$ | −9.24716E − 24 |
|   |   |   | $As_{11}$ | −1.55492E − 26 |
|   |   |   | $As_{12}$ | −8.50442E − 28 |
|   |   |   | $As_{13}$ | 1.86617E − 30 |
|   |   |   | $As_{14}$ | 2.95587E − 32 |
| 4 | Km | 3.54325E − 01 | $As_2$ | 3.05072E − 07 |
|   | $Am_4$ | −2.92412E − 08 | $As_4$ | 1.68480E − 11 |
|   | $Am_6$ | −4.56707E − 13 | $As_6$ | −2.17134E − 16 |
|   | $Am_8$ | 5.10627E − 17 | $As_8$ | 8.96057E − 20 |
|   | $Am_{10}$ | −1.35805E − 21 | $As_{10}$ | 2.90248E − 24 |
|   | $Am_{12}$ | 2.46817E − 25 | $As_{12}$ | −2.14331E − 28 |
|   | $Am_{14}$ | 7.10193E − 31 | $As_{14}$ | −3.79952E − 32 |
|   | $Am_{16}$ | −5.67034E − 35 |   |   |

Figure 12A:
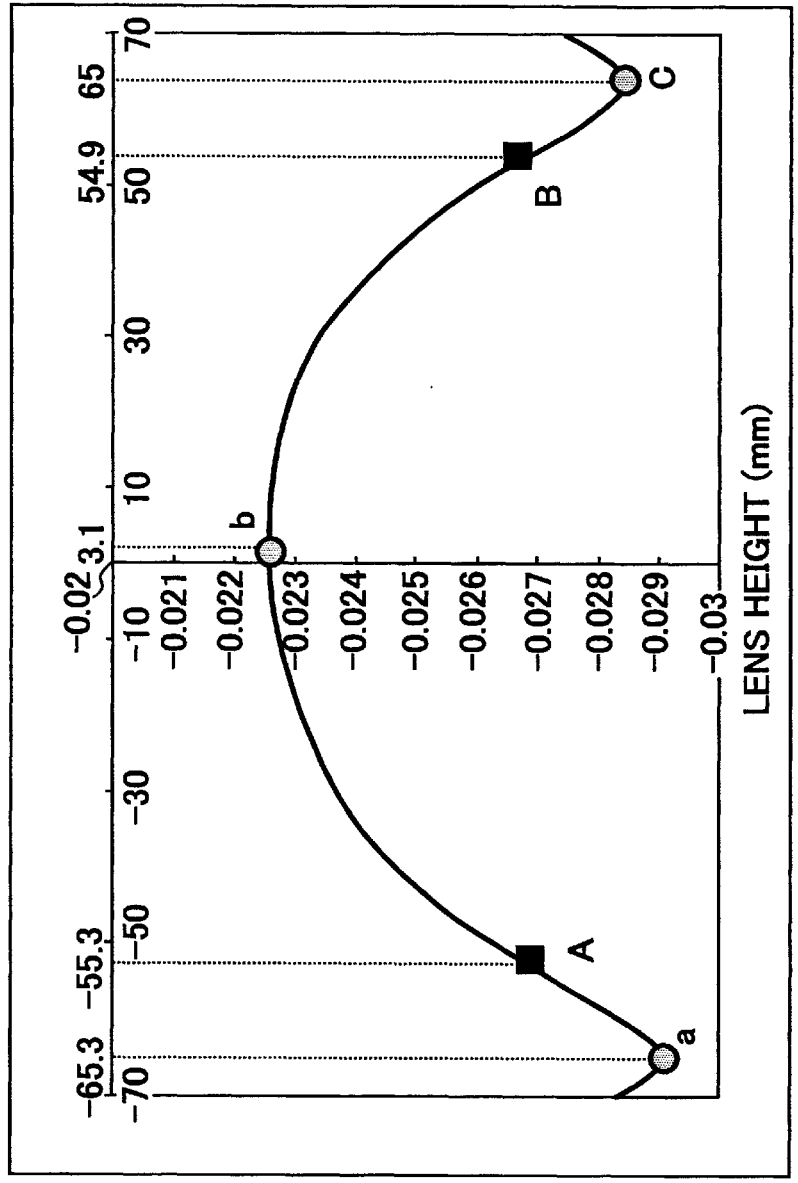
FIGS. 12(a), 12(b), 12(c) are diagrams showing a relationship in Example 5 between a change of a sub-scanning curvature in a special surface of a scanning image formation lens and a change of a lateral magnification ratio in a sub-scanning direction.
Figure 12B:
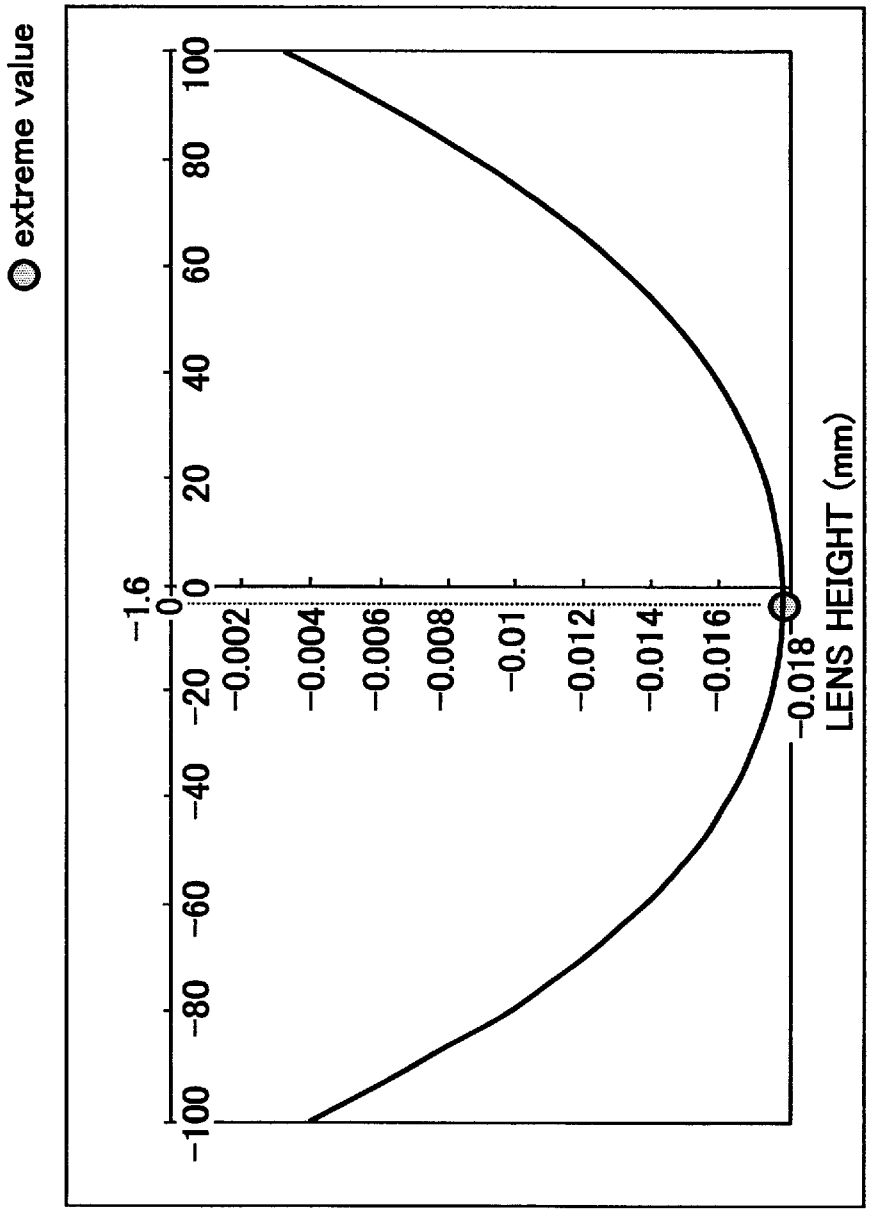

FIGS. 12(a) and 12(b) indicates a change of a sub-scanning curvature on the second surface and the third surface. The second surface is "a special surface" in which the change of its sub-scanning curvature is non-symmetrical in its main scanning direction relative to the optical axis and such curvature change has three extreme values and has two inflection points, and one of the extreme values is near an optical axis.

The third surface is "a special surface" in which the change of its sub scanning curvature is non-symmetrical in its main scanning direction relative to the optical axis and such curvature change has one extreme value near an optical axis.

Figure 12C:
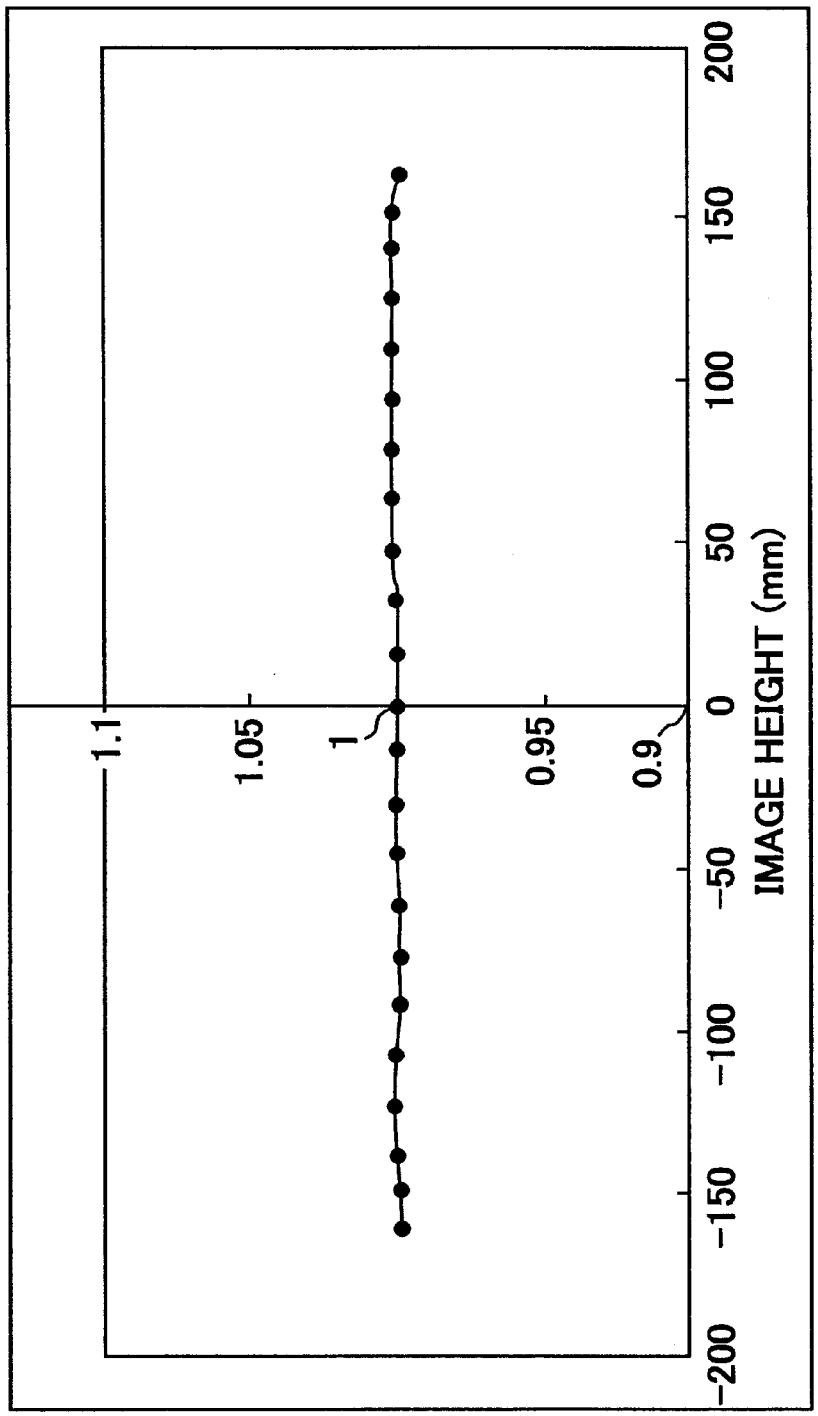

FIG. 12(c) indicates a change of a lateral magnification according to the image height in the sub-scanning direction of a scanning image formation lens in Example 5. As shown in FIG. 12(c), the lateral magnification changes only slightly when the image height changes, thereby satisfying condition (2).

The value of Fs/W, a parameter of the condition (3), is 0.055/323=0.00017, thereby satisfying the condition (3).

The value of |(he)/(hmax)|, parameters of the condition (1), on points a and c in FIG. 12(a), are as follows:

Point a: |(−65.3)/(−70)|=0.93
Point b: |(+65)/(+70)|=0.93

The condition (1) is satisfied by the above extreme values.

The value of |(hi)/(hmax)|, parameters of the condition (4), on points A and B in FIG. 12(a), are as follows:

Point A: |(−55.3)/(−70)|=0.79
Point B: |(+54.9)/(+70)|=0.78

The condition (4) is satisfied by the above inflection points.

EXAMPLE 6

Natural light converging point: ∞ (A light beam coupled by the coupling lens becomes a parallel light beam)
Polygon mirror incidence angle: θ=60 degrees
The number of deflective reflecting surfaces of polygon mirror: 5
The radius of an inscribed circle of the polygon mirror: 20 mm
A center axis deviation ξ of the polygon mirror: 8.00 mm
Angle of view: −41 degrees to +41 degrees
Deflective reflecting surface (surface number: 0) of the polygon mirror has the following lens data:

| SURFACE NUMBER | Rm | Rs | x (SURFACE INTERVAL) | y | n (INDEX OF REFRACTION) |
|---|---|---|---|---|---|
| 0 | ∞ | ∞ | 72.560 | 0.406 |   |
| 1 | 1616.43 | −50.145 | 35.000 |   | 1.52398 |
| 2 | −146.513 | −199.813 | 61.933 | −0.003 |   |
| 3 | 400.875 | −72.026 | 14.000 |   | 1.52398 |
| 4 | 824.882 | −27.588 | 160.556 |   |   |

The second surface and the third surface are "special surfaces", the first surface and the fourth surface are "special surfaces in which the change of its sub-scanning curvature is non-symmetrical in its main scanning direction relative to the optical axis and such curvature change has one or more than one inflection point."

Various coefficients in relation to the above first to fourth surfaces are listed in the following Table 6:

TABLE 6

| SURFACE NUMBER | MAIN SCANNING DIRECTION COEFFICIENTS | | SUB-SCANNING DIRECTION COEFFICIENTS | |
|---|---|---|---|---|
| 1 | Km | 1.97575E + 02 | $As_1$ | −1.16188E − 05 |
|   | $A_4$ | 1.28069E − 08 | $As_2$ | 2.27602E − 06 |
|   | $A_6$ | −6.37387E − 13 | $As_3$ | 2.71426E − 09 |
|   | $A_8$ | −9.42785E − 17 | $As_4$ | −1.54407E − 10 |
|   | $A_{10}$ | 5.96529E − 21 | $As_5$ | −4.26541E − 13 |
|   |   |   | $As_6$ | 6.41742E − 15 |
|   |   |   | $A_7$ | 9.17947E − 19 |
|   |   |   | $A_8$ | −1.23000E − 19 |
|   |   |   | $A_9$ | 1.45323E − 20 |
|   |   |   | $A_{10}$ | −1.88141E − 22 |
|   |   |   | $A_{11}$ | −1.46810E − 24 |
|   |   |   | $A_{12}$ | −2.67024E − 26 |
| 2 | Km | −1.85698E − 01 | $As_2$ | −2.12474E − 06 |
|   | $Am_4$ | 1.77425E − 08 | $As_4$ | 1.80451E − 11 |
|   | $Am_6$ | 1.38382E − 13 | $As_6$ | 2.71561E − 14 |
|   | $Am_8$ | −4.35448E − 17 | $As_8$ | 6.92367E − 19 |
|   | $Am_{10}$ | 7.16836E − 21 | $As_{10}$ | −2.68531E − 22 |
|   |   |   | $As_{12}$ | −5.77827E − 26 |
| 3 | Km | −1.26034E + 01 | $As_2$ | −1.96181E − 07 |
|   | $A_4$ | −7.34917E − 09 | $As_4$ | 2.22962E − 11 |
|   | $A_6$ | −2.10556E − 13 | $As_6$ | −1.02156E − 15 |
|   | $A_8$ | 8.17266E − 18 | $As_8$ | 1.08112E − 20 |
|   | $A_{10}$ | 5.40930E − 22 | $As_{10}$ | 6.36324E − 25 |
|   | $A_{12}$ | −1.08192E − 26 | $As_{12}$ | −3.64493E − 29 |
|   | $A_{14}$ | −2.03912E − 32 |   |   |
| 4 | Km | −7.10675E + 01 | $As_1$ | −8.54599E − 07 |
|   | $Am_4$ | −1.32377E − 08 | $As_2$ | 4.16145E − 07 |
|   | $Am_6$ | 9.66239E − 14 | $As_3$ | −2.52260E − 11 |
|   | $Am_8$ | 1.88752E − 17 | $As_4$ | −2.95988E − 11 |
|   | $Am_{10}$ | −3.10159E − 22 | $As_5$ | 2.11353E − 16 |
|   | $Am_{12}$ | 7.29788E − 27 | $As_6$ | 1.16043E − 15 |
|   | $Am_{14}$ | 2.30518E − 32 | $As_7$ | 4.37152E − 22 |
|   |   |   | $As_8$ | −1.09807E − 21 |
|   |   |   | $As_9$ | 5.55967E − 24 |
|   |   |   | $As_{10}$ | −7.78461E − 25 |
|   |   |   | $As_{11}$ | −1.61687E − 29 |
|   |   |   | $As_{12}$ | 3.26221E − 30 |

Figure 15A:
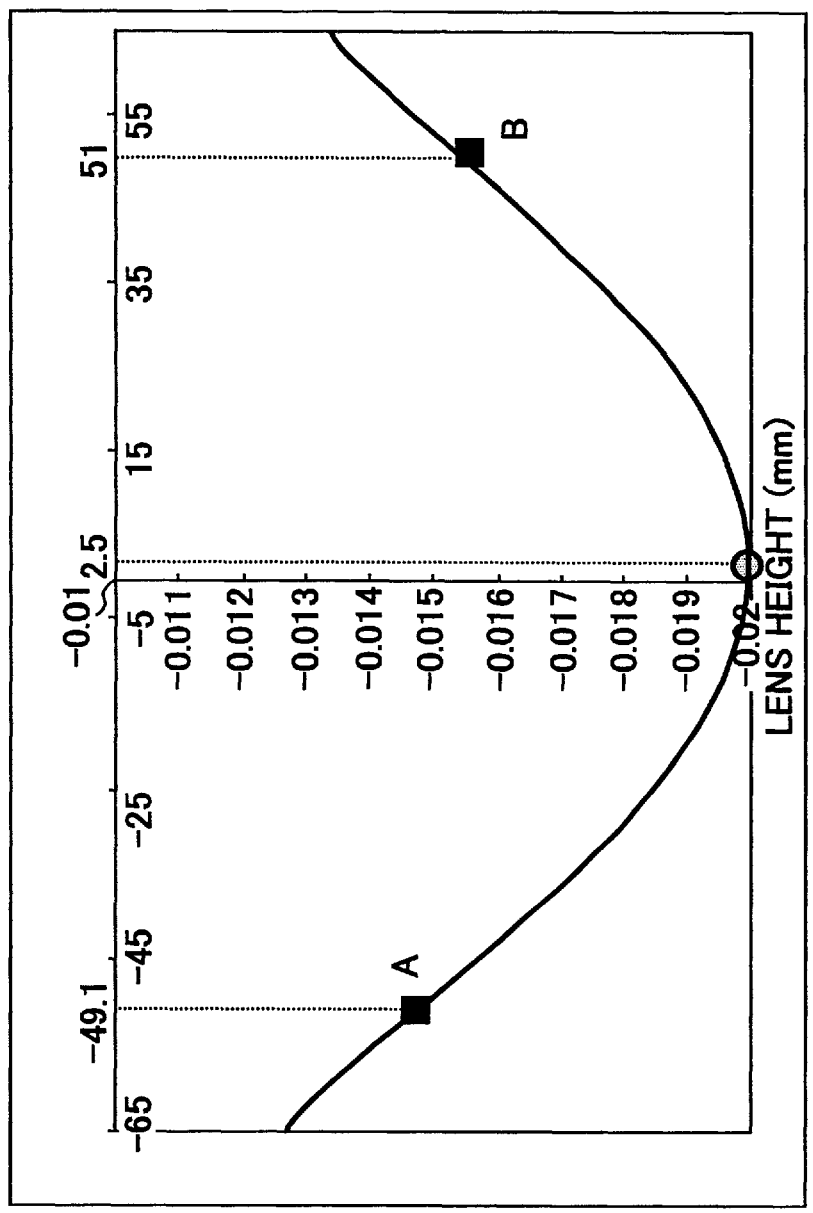
FIGS. 15(a), 15(b), 15(c) are diagrams showing a relationship in Example 6 between a change of a sub-scanning curvature in a special surface of a scanning image formation lens and a change of a lateral magnification ratio in a sub-scanning direction.
Figure 15B:
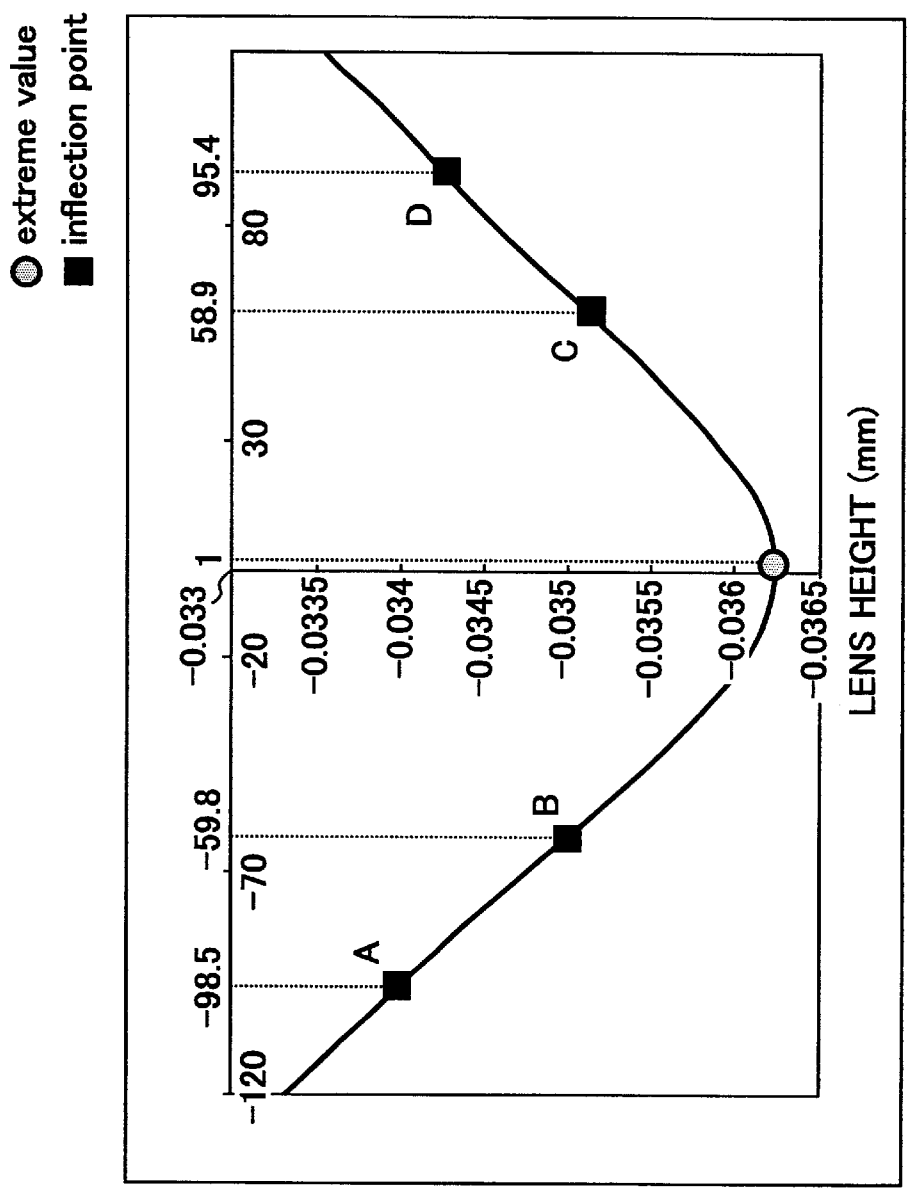

FIGS. 15(a) and 15(b) indicate a change of a sub-scanning curvature on the first surface and the fourth surface. The first surface is "a special surface" in which the change of its sub scanning curvature is non-symmetrical in its main scanning direction relative to the optical axis and such curvature change has one extreme value and two inflection points. The fourth surface is "a special surface" in which the change of its sub-scanning curvature is non-symmetrical in its main scanning direction relative to the optical axis and such curvature change has one extreme value and four inflection points.

Figure 15C:
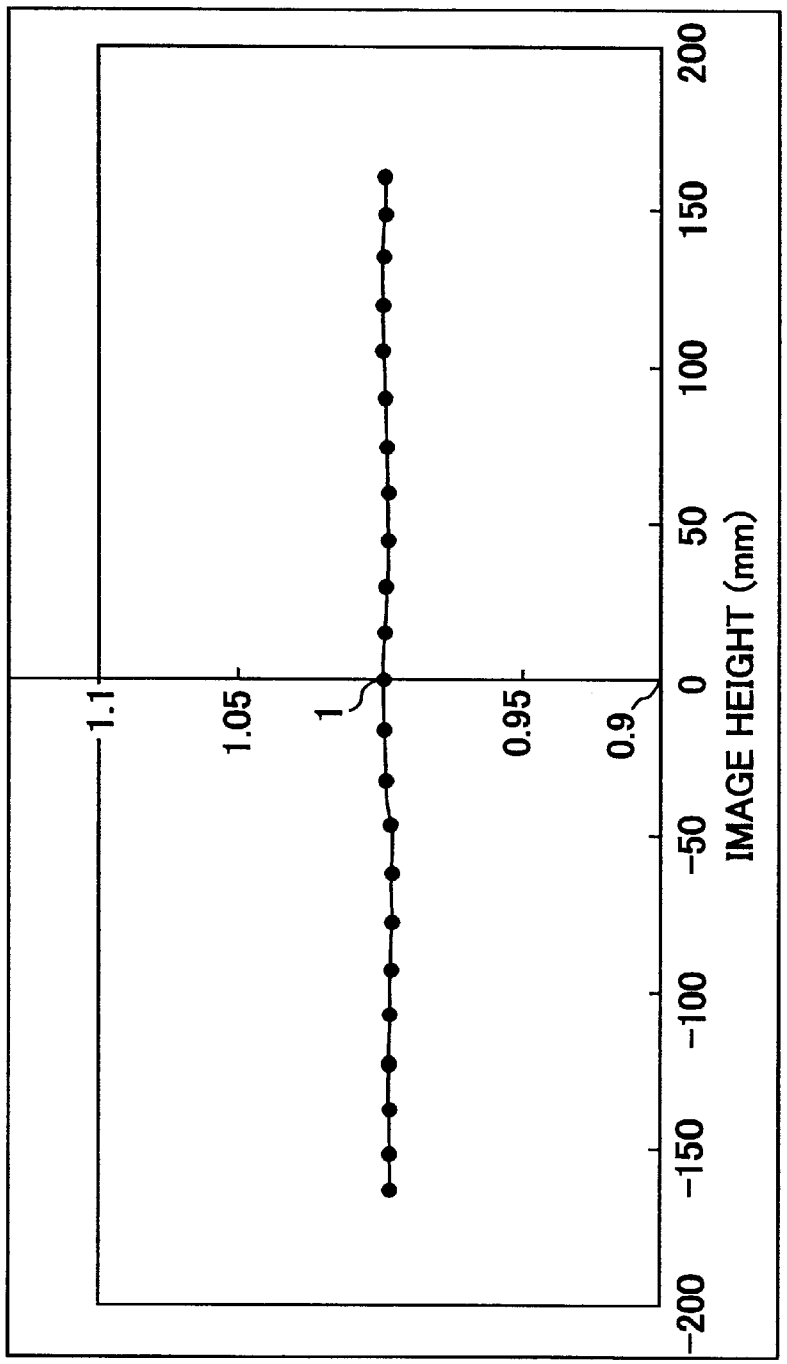

FIG. 15(c) indicates a change of a lateral magnification according to the image height in the sub-scanning direction of a scanning image formation lens in Example 6. As shown in FIG. 15(c), the lateral magnification changes only slightly when the image height changes, thereby satisfying the condition (5).

The value of $|(hi)/(hmax)|$, parameters of the condition (4), at inflection points A and B in FIG. 15(a), are as follows:

Point A: $|(-48.7)/(-65)|=0.76$

Point B: $|(+51)/(+65)|0.78$

The condition (4) is satisfied by the above inflection points.

The value of $|(hi)/(hmax)|$, parameters of the condition (4) at inflection points A, B, C, D in FIG. 15(b), are as follows:

Point A: $|(-98.5)/(-120)|=0.82$

Point B: $|(-59.8)/(-120)|=0.49$

Point C: $|(+58.9)/(+120)|=0.49$

Point D: $|(+95.4/(+120)|=0.79$

The condition (4) is satisfied by the two inflection points A, D.

The value of Fs/W, a parameter of the condition (6), is $0.103/323=0.00032$, thereby satisfying the condition (6).

EXAMPLE 7

Natural light converging point: ∞ (A light beam coupled by the coupling lens becomes a parallel light beam)

Polygon mirror incidence angle: θ=60 degrees

The number of deflective reflecting surfaces of polygon mirror: 5

The radius of an inscribed circle of the polygon mirror: 20 mm.

A center axis deviation ξ of the polygon mirror: 8.00 mm

Angle of view: −42 degrees to +42 degrees

Deflective reflecting surface (surface number: 0) of polygon mirror has the following lens data:

| SURFACE NUMBER | Rm | Rs | x (SURFACE INTERVAL) | Y | n (INDEX OF REFRACTION) |
|---|---|---|---|---|---|
| 0 | ∞ | ∞ | 55.843 | 0.225 | |
| 1 | −309.8349 | −42.49098 | 30.936 | | 1.52398 |
| 2 | −81.43781 | −3654.70765 | 69.525 | 0.002 | |
| 3 | −129.98675 | 119.29058 | 10.713 | | 1.52398 |
| 4 | −151.53111 | −50.74749 | 149.195 | | |

The first surface and the fourth surface are "special surfaces", the second surface and the third surface are "special surfaces in which the change of its sub-scanning curvature is non-symmetrical in its main scanning direction relative to the optical axis and such curvature change has one or more than one extreme value or more than one inflection point."

Various coefficients in relation to the above first to fourth surfaces are listed in the following Table 7:

TABLE 7

| SURFACE NUMBER | MAIN SCANNING DIRECTION COEFFICIENTS | | SUB-SCANNING DIRECTION COEFFICIENTS | |
|---|---|---|---|---|
| 1 | Km | 4.15063E + 00 | $As_2$ | −1.75245E − 05 |
| | $Am_4$ | −9.90717E − 09 | $As_4$ | −4.46335E − 09 |
| | $Am_6$ | 3.31468E − 12 | $As_6$ | 7.22109E − 13 |
| | $Am_8$ | −2.11921E − 17 | $As_8$ | −9.16293E − 18 |
| | $Am_{10}$ | −1.33226E − 20 | $As_{10}$ | 2.35663E − 20 |
| 2 | Km | −6.99241E − 01 | $As_1$ | 1.73468E − 05 |
| | $Am_4$ | −4.76262E − 08 | $As_2$ | −1.25028E − 06 |
| | $Am_6$ | −3.44615E − 12 | $As_3$ | 1.14058E − 10 |
| | $Am_8$ | 1.72913E − 15 | $As_4$ | −2.42325E − 09 |
| | $Am_{10}$ | 2.69775E − 20 | $As_5$ | 6.99847E − 13 |
| | | | $As_6$ | −2.55691E − 14 |
| | | | $As_7$ | −4.69879E − 16 |
| | | | $As_8$ | −1.38257E − 16 |
| | | | $As_9$ | 1.22710E − 19 |
| | | | $As_{10}$ | 2.81193E − 20 |
| 3 | Km | −9.74029E − 01 | $As_1$ | 2.76412E − 06 |
| | $Am_4$ | −4.42155E − 08 | $As_2$ | 2.28254E − 06 |
| | $Am_6$ | 7.75828E − 13 | $As_3$ | 1.72881E − 11 |
| | $Am_8$ | 1.06567E − 16 | $As_4$ | −2.52776E − 10 |
| | $Am_{10}$ | 1.24789E − 20 | $As_5$ | −6.03037E − 14 |
| | $Am_{12}$ | 7.01890E − 25 | $As_6$ | −7.84560E − 15 |
| | $Am_{14}$ | −7.04395E − 29 | $As_7$ | 3.02422E − 17 |
| | | | $As_8$ | −1.88189E − 19 |
| | | | $As_9$ | −6.46649E − 21 |
| | | | $As_{10}$ | 9.92492E − 23 |
| | | | $As_{11}$ | 6.64734E − 25 |
| | | | $As_{12}$ | −9.07030E − 27 |
| | | | $As_{13}$ | −2.58944E − 29 |
| | | | $As_{14}$ | 3.26089E − 31 |
| 4 | Km | 1.21215E − 01 | $As_2$ | 1.47597E − 06 |
| | $Am_4$ | −6.49966E − 08 | $As_4$ | −2.09490E − 10 |
| | $Am_6$ | 1.06103E − 12 | $As_6$ | −4.77018E − 15 |
| | $Am_8$ | −1.72481E − 16 | $As_8$ | 7.38131E − 20 |
| | $Am_{10}$ | 1.00400E − 20 | $As_{10}$ | −4.73871E − 24 |
| | $Am_{12}$ | −1.00352E − 25 | $As_{12}$ | −4.70587E − 27 |
| | $Am_{14}$ | 3.75296E − 29 | $As_{14}$ | 1.07314E − 31 |

Figure 18A:
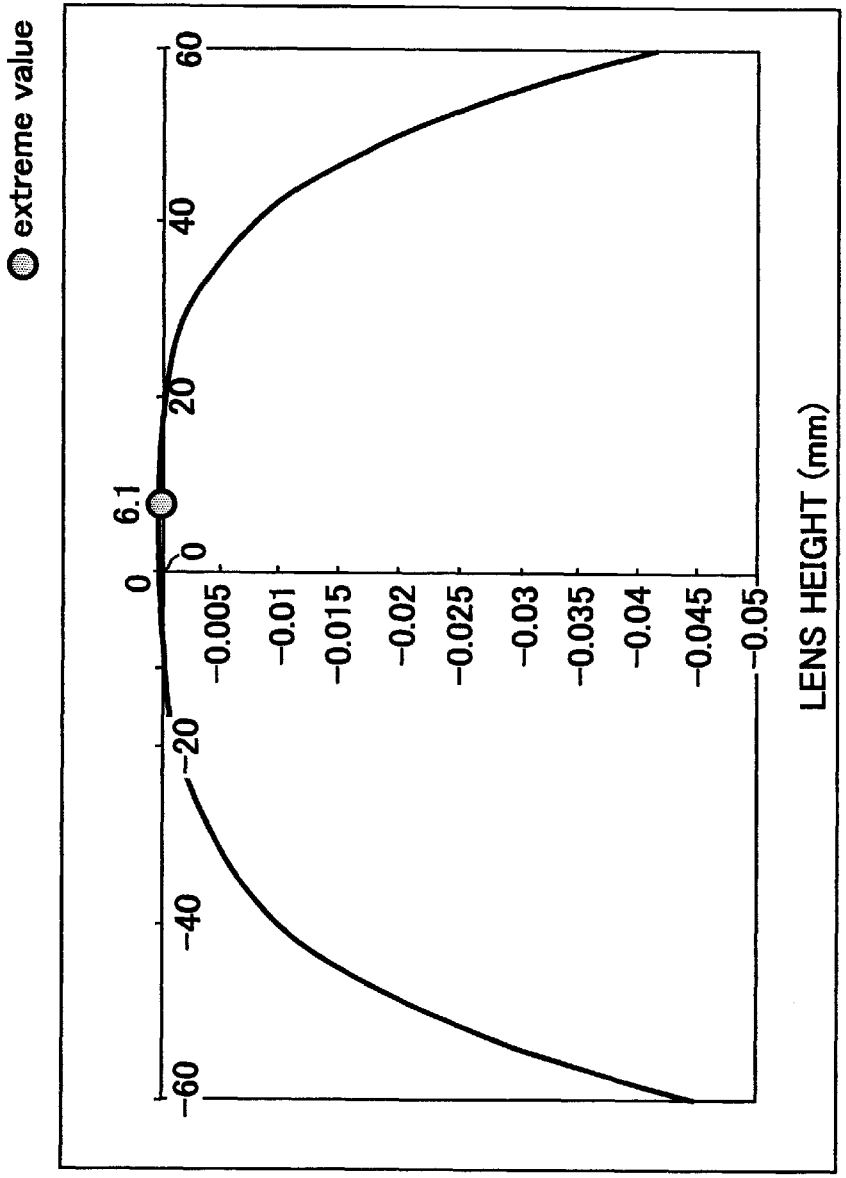
Figure 18B:
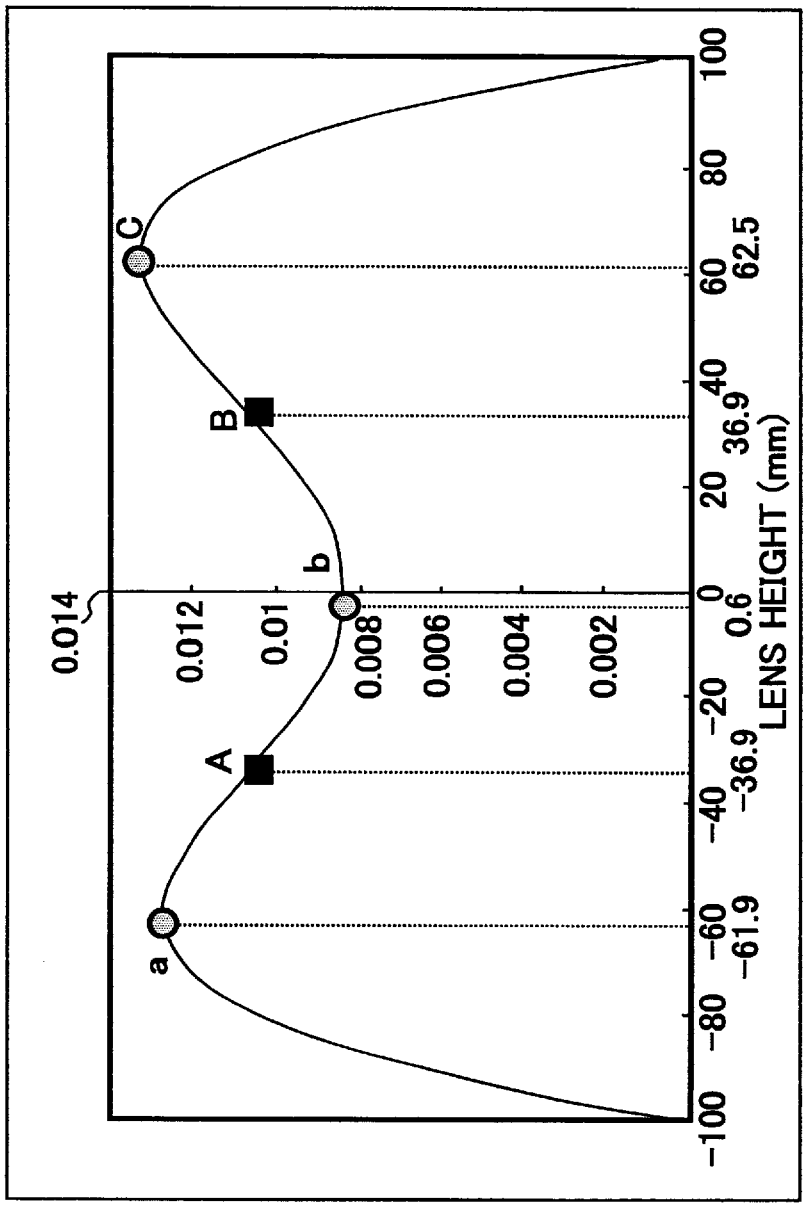

FIGS. 18(a) and 18(b) indicate a change of a sub-scanning curvature on the second surface and the third surface. The second surface is "a special surface" in which the change of its sub-scanning curvature is non-symmetrical in its main scanning direction relative to the optical axis and such curvature change has one extreme value near an optical axis. The third surface is "a special surface" in which the change of its sub scanning curvature is non-symmetrical in its main scanning direction relative to the optical axis and such curvature change has three extreme values and two inflection points.

FIG. 18(c) indicates a change of a lateral magnification according to the image height in the sub-scanning direction of a scanning image formation lens in Example 7. As shown in FIG. 18(c), the lateral magnification changes only slightly when the image height changes, thereby satisfying the condition (5).

The value of $|(he)/(hmax)|$, parameters of the condition (1), on points a and c in FIG. 18(b), are as follows:

Point a: $|(-61.9)/(-100)|=0.62$

Point c: $|(+62.5)/(+100)|=0.63$

The condition (1) is satisfied by the above extreme value.

The value of Fs/W, a parameter of the condition (6), is $0.065/323=0.0002$, thereby satisfying the condition (6).

Figure 13:
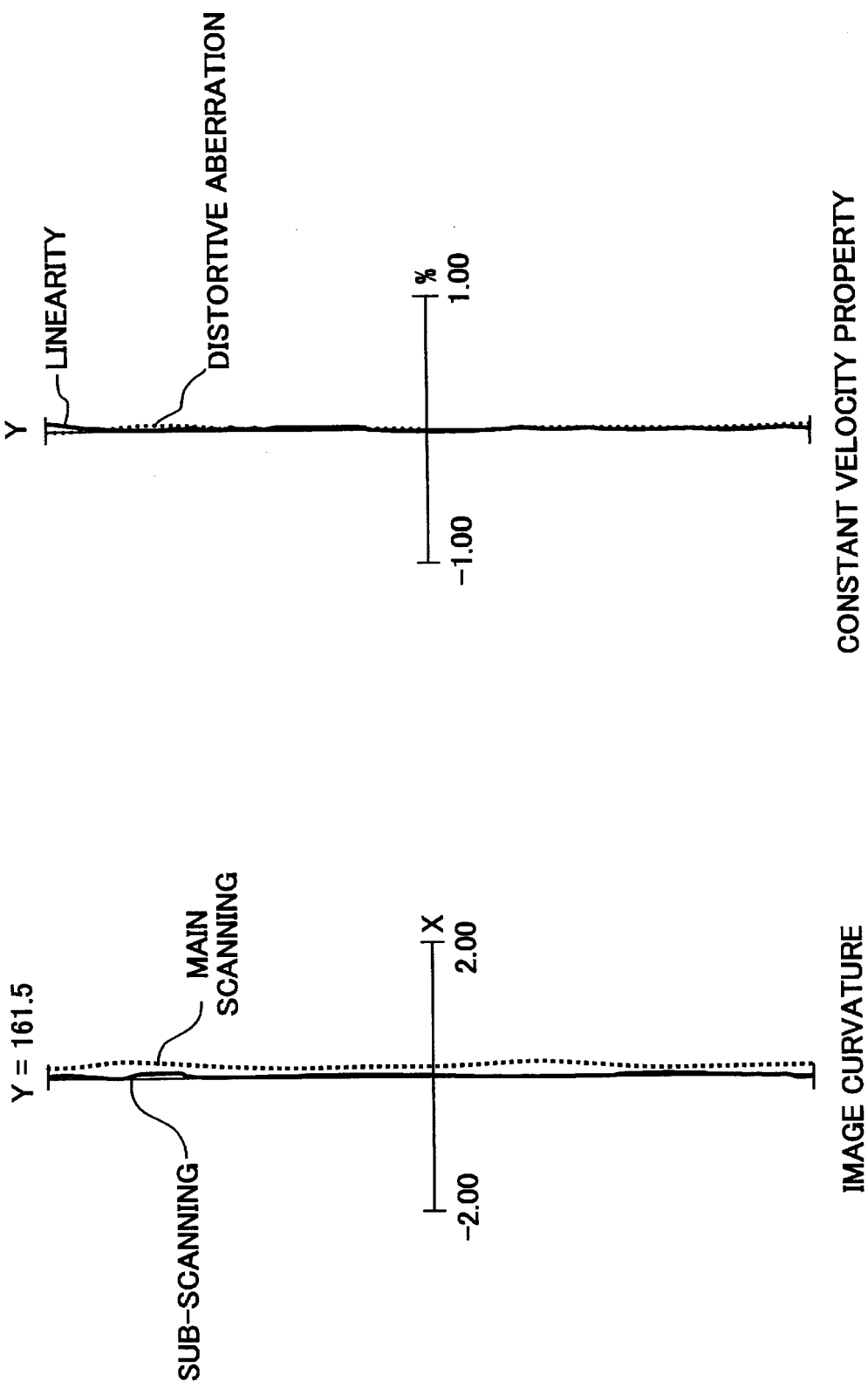
FIG. 13 is a diagram showing an image curvature and constant velocity characteristics of Example 5.
Figure 16:
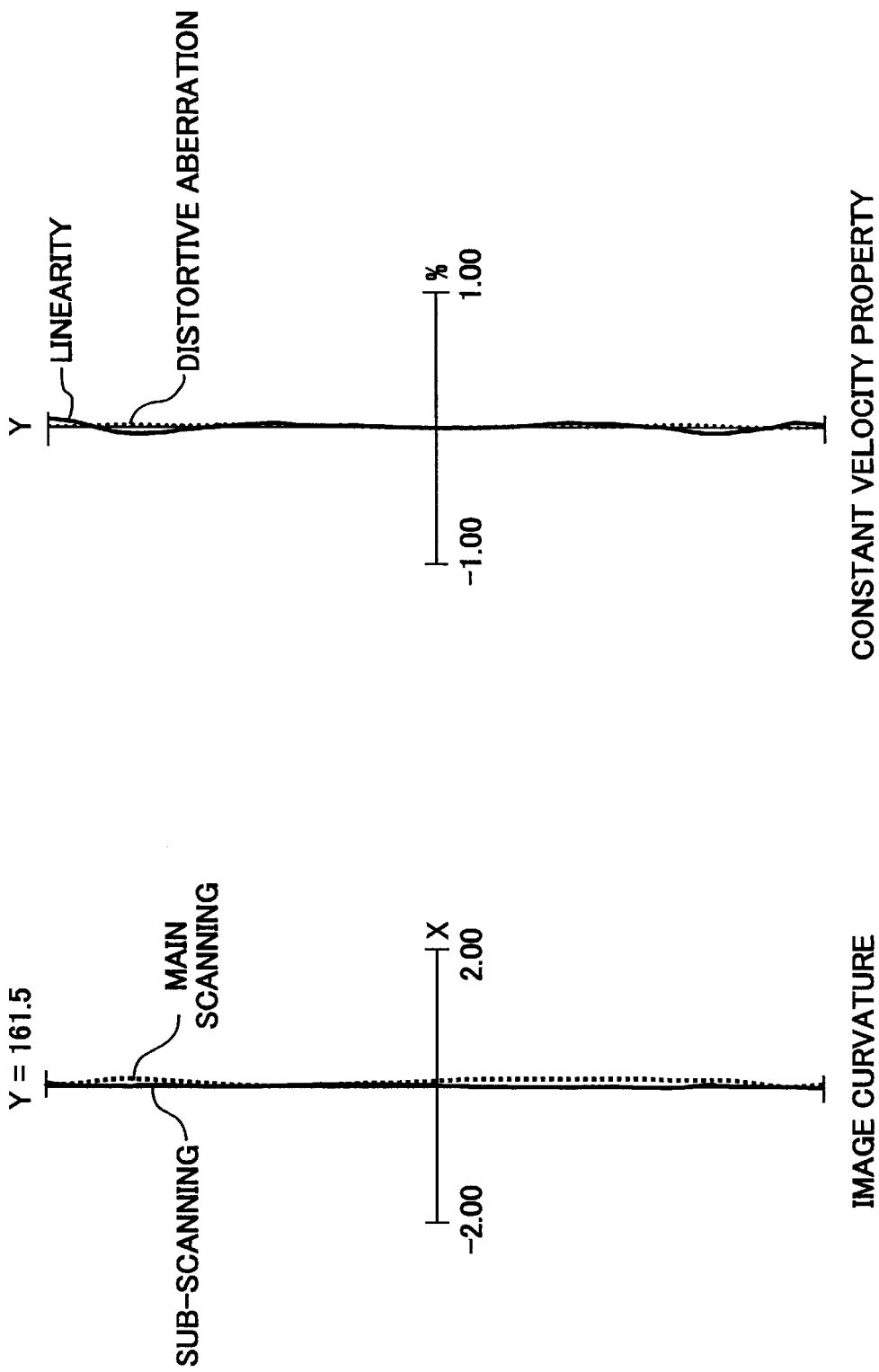
FIG. 16 is a diagram showing an image curvature and constant velocity characteristics of Example 6.

FIG. 13, FIG. 16 and FIG. 19 indicate an image curvature property and a constant velocity property in relation to the above Example 5, Example 6 and Example 7. In Example 5 and Example 6, and in Example 7, it can be seen that the image curvature in both the main scanning direction and the sub-scanning direction has been corrected extremely accurately and the velocity property is also excellent.

As described above, with the use of novel features of preferred embodiments of the present invention, it is possible to provide a novel scanning image formation lens and a novel light scanning apparatus.

The scanning image formation lens according to preferred embodiments of the present invention is capable of properly and accurately correcting image curvature regardless of whether sag occurs, thereby making it possible to form a stabilized beam spot having a uniform and sufficiently small beam spot diameter. Further, with the use of the scanning image formation lens made according to preferred embodiments of the present invention, the optical scanning apparatus reliably produces a stabilized light beam spot having a uniform and sufficiently small beam spot diameter, so as to effectively perform a desired information writing operation (information recording) with a high recording density.

Numerous additional modifications and variations of the present inventions are possible in light of the above teachings. It is therefore to be understood that within the cope of the appended claims, the present invention may be practiced otherwise than as specifically described herein.

What is claimed is:

1. A scanning apparatus including a scanning image formation lens comprising:

at least two separate lens elements; wherein
at least two surfaces of the at least two separate lens elements have a special surface in which a sub-scanning curvature changes in a main scanning direction according to a distance from an optical axis toward a periphery of the lens surface such that a line passing through centers of curvature in the sub-scanning curvature is curved, and at least one of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, wherein a change in the sub-scanning curvature has at least two extreme values, and wherein at least one of the extreme values is located so as to satisfy a following condition, wherein a position in the main scanning position is expressed by he and an effective lens height from the optical axis on a positive image height side or a negative image height side is expressed by hmax $|(he)/(hmax)|>0.5.$ 2. A scanning apparatus including a scanning image formation lens comprising:

at least two separate lens elements; wherein
at least two surfaces of the at least two separate lens elements have a special surface in which a sub-scanning curvature changes in a main scanning direction according to a distance from an optical axis toward a periphery of the lens surface such that a line passing through centers of curvature in the sub scanning curvature is curved, and at least one of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, and wherein, when an effective writing width is represented by W, and a width of the sub-scanning image curvature within the effective writing width is represented by Fs, a following condition is satisfied $Fs/W<0.005.$ 3. The scanning apparatus according to claim 1 or 2, wherein the special surface of one of the at least two surfaces is located closest to an optical deflector or opposite to a surface that is closest to an optical deflector, and the special surface of the other of the at least two surfaces is located closest to an image side or opposite to a surface that is closest to an image side.

4. The scanning apparatus according to claim 1 or 2, wherein at least one of the two separate lens elements is a meniscus lens in a sub scanning direction.

5. The scanning apparatus according to claim 1 or 2, wherein a change in the sub scanning curvature has an extreme value in the vicinity of the optical axis.

6. The scanning apparatus according to claim 1 or 2, wherein at least one of the two separate lens elements is configured such that a lateral magnification in the sub scanning direction is substantially constant in the image height.

7. The scanning apparatus according to claim 1 or 2, wherein a change in the sub scanning curvature has at least two inflection points.

8. The scanning apparatus according to claim 1 or 2, wherein a change in the sub scanning curvature has at least three inflection points.

9. The scanning apparatus according to claim 1 or 2, wherein a change in the sub scanning curvature has an extreme value in the vicinity of a periphery of the lens surface.

10. A scanning apparatus including a scanning image formation lens comprising:

at least two separate lens elements; wherein
at least two surfaces of the at least two separate lens elements have a special surface in which a sub-scanning curvature changes in a main scanning direction according to a distance from an optical axis toward a periphery of the lens surface such that a line passing through centers of curvature in the sub scanning curvature is curved, and both of the two surfaces having the special surface being arranged such the change of the sub-scanning curvature is non-symmetrical in the main scanning direction relative to the optical axis, wherein the at least two surfaces having the special surfaces are located at one surface of each of the at least two separate lens elements, wherein a change in the sub-scanning curvature has at least two extreme values, and wherein at least one of the extreme values is located so as to satisfy a following condition, wherein a position in the main scanning position is expressed by he and an effective lens height from the optical axis on a positive image height side or a negative image height side is expressed by hmax $|(he)/(hmax)|>0.5.$ 11. A scanning apparatus including a scanning image formation lens comprising:

at least two separate elements; wherein
at least two surfaces of the at least two separate lens elements have a special surface in which a sub-scanning curvature changes in a main scanning direction according to a distance from an optical axis toward a periphery of the lens surface such that a line passing through centers of curvature in the sub scanning curvature is curved, and both of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, and wherein, when an effective writing width is represented by W, and a width of the sub-scanning image curvature within the effective writing width is represented by Fs, a following condition is satisfied Fs/W<0.005.

12. The scanning apparatus according to claim 10 or 11, wherein the special surface of one of the at least two surfaces is located closest to an optical deflector or opposite to a surface that is closest to an optical deflector, and the special surface of the other of the at least two surfaces is located closest to an image side or opposite to a surface that is closest to an image side.

13. The scanning apparatus according to claim 10 or 11, wherein at least one of the two separate lens elements is a meniscus lens in a sub scanning direction.

14. The scanning apparatus according to claim 10 or 11, wherein a change in the sub scanning curvature has an extreme value in the vicinity of the optical axis.

15. The scanning apparatus according to claim 10 or 11, wherein at least one of the two separate lens elements is configured such that a lateral magnification in the sub scanning direction is substantially constant in the image height.

16. The scanning apparatus according to claim 10 or 11, wherein a change in the sub scanning curvature has at least two inflection points.

17. The scanning apparatus according to claim 10 or 11, wherein a change in the sub scanning curvature has at least three inflection points.

18. The scanning apparatus according to claim 10 or 11, wherein a change in the sub scanning curvature has an extreme value in the vicinity of a periphery of the lens surface.

19. The scanning apparatus according to claim 10 or 11, wherein the scanning image formation lens satisfies a following condition, when a lateral magnification in the sub scanning direction on the optical axis is represented by $\beta_o$ and a lateral magnification in the sub scanning direction on any image height is represented by $\beta h$:

0.93<|$\beta h/\beta_o$|<1.07.

20. An image forming apparatus comprising:
at least two separate lens elements; wherein
at least two surfaces of the at least two separate lens elements have a special surface in which s sub-scanning curvature changes in a main scanning direction according to a distance from an optical axis toward a periphery of the lens surface such that a line passing through centers of curvature in the sub-scanning curvature is curved, and at least one of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, wherein a change in the sub-scanning curvature has at least two extreme values, and wherein at least one of the extreme values is located so as to satisfy a following condition, wherein a position in a main scanning position is expressed by he and an effective lens height from the optical axis on a positive image height side or a negative image height side is expressed by hmax

|(he)/(hmax)|>0.5.

21. An image forming apparatus comprising:
at least two separate lens elements; wherein
at least two surfaces of the at least two separate lens elements have a special surface in which a sub-scanning curvature changes in a main scanning direction according to a distance from an optical axis toward a periphery of the lens surface such that a line passing through centers of curvature in the sub scanning curvature is curved, and at least one of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, and wherein, when an effective writing width is represented by W, and a width of the sub-scanning image curvature within the effective writing width is represented by Fs, a following condition is satisfied Fs/W<0.005.

22. A method of forming a scanning image forming lens comprising the steps of:
forming at least two separate lens elements such that at least two surfaces of the at least two separate lens elements have a special surface in which a sub-scanning curvature changes in a main scanning direction according to a distance from an optical axis toward a periphery of the lens surface such that a line passing through centers of curvature in the sub scanning curvature is curved, and at least one of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, wherein a change in the sub-scanning curvature has at least two extreme values, and wherein at least at least one of the extreme values is located so as to satisfy a following condition, wherein a position in the main scanning position is expressed by he and an effective lens height from the optical axis on a positive image height side or a negative image height side is expressed by hmax

|(he)/(hmax)|>0.5.

23. A scanning apparatus including a scanning image formation lens comprising:
at least two separate lens elements; wherein
at least two surfaces of the at least two separate lens elements have a special surface in which a sub-scanning curvature changes in a main scanning direction according to a distance from an optical axis toward a periphery of the lens surface such that a line passing through centers of curvature in the sub scanning curvature is curved, and at least one of the two surfaces having the special surface being arranged such that the change of the sub-scanning curvature is non-symmetrical in the main scanning direction relative to the optical axis, wherein the at least two surfaces having the special surfaces are located at one surface of each of the at least two separate lens elements, wherein a change in the sub-scanning curvature has an extreme value in the vicinity of the optical axis, and wherein, when an effective writing width is represented by W, and a width of the sub-scanning image curvature within the effective writing width is represented by Fs, a following condition is satisfied $Fs/W < 0.005$.

* * * * *